(12) United States Patent
Gwon et al.

(10) Patent No.: US 11,984,592 B2
(45) Date of Patent: May 14, 2024

(54) COMPOSITE SOLID ELECTROLYTE, METHOD OF PREPARING COMPOSITE SOLID ELECTROLYTE, AND ELECTROCHEMICAL BATTERY INCLUDING COMPOSITE SOLID ELECTROLYTE

(71) Applicant: SAMSUNG ELECTRONICS CO., LTD., Suwon-si (KR)

(72) Inventors: Hyeokjo Gwon, Hwaseong-si (KR); Jusik Kim, Hwaseong-si (KR); Wooyoung Yang, Hwaseong-si (KR); Ryounghee Kim, Uiwang-si (KR); Sewon Kim, Suwon-si (KR); Sungkyun Jung, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 283 days.

(21) Appl. No.: 16/989,956

(22) Filed: Aug. 11, 2020

(65) Prior Publication Data
US 2021/0249655 A1   Aug. 12, 2021

(30) Foreign Application Priority Data
Feb. 12, 2020 (KR) .................. 10-2020-0017142

(51) Int. Cl.
*H01M 4/525* (2010.01)
*H01M 4/02* (2006.01)
(Continued)

(52) U.S. Cl.
CPC ........... *H01M 4/525* (2013.01); *H01M 4/131* (2013.01); *H01M 4/133* (2013.01); *H01M 4/366* (2013.01);
(Continued)

(58) Field of Classification Search
CPC . H01M 2300/0065–008; H01M 10/056–0562; H01M 10/0565
See application file for complete search history.

(56) References Cited

U.S. PATENT DOCUMENTS

| 2004/0013924 A1* | 1/2004 | Park ............. H01M 8/124 429/535 |
| 2014/0057153 A1 | 2/2014 | Visco et al. |

(Continued)

FOREIGN PATENT DOCUMENTS

| CN | 104103873 A | * 10/2014 | ............ H01M 12/08 |
| CN | 104103873 B | 5/2017 | |

(Continued)

OTHER PUBLICATIONS

Chen, Renjie, et al. "The pursuit of solid-state electrolytes for lithium batteries: from comprehensive insight to emerging horizons." Materials Horizons 3.6 (2016): 487-516. (Year: 2016).*

(Continued)

*Primary Examiner* — Sadie White
*Assistant Examiner* — Kayla Elaine Clary
(74) *Attorney, Agent, or Firm* — CANTOR COLBURN LLP

(57) ABSTRACT

A composite solid electrolyte including: a porous nanostructure; and a solid electrolyte disposed on a surface of the porous nanostructure, wherein the composite solid electrolyte satisfies Equation 1

$$0 < T_{SE}/D < 4 \qquad \text{Equation 1}$$

wherein $T_{SE}$ is a thickness of the solid electrolyte, and D is an average diameter of pores of the porous nanostructure.

13 Claims, 8 Drawing Sheets

(51) Int. Cl.
*H01M 4/131* (2010.01)
*H01M 4/133* (2010.01)
*H01M 4/36* (2006.01)
*H01M 10/0525* (2010.01)

(52) U.S. Cl.
CPC .. *H01M 10/0525* (2013.01); *H01M 2004/027* (2013.01); *H01M 2004/028* (2013.01); *H01M 2300/0028* (2013.01); *H01M 2300/0071* (2013.01)

(56) References Cited

U.S. PATENT DOCUMENTS

| | | | |
|---|---|---|---|
| 2016/0141580 A1* | 5/2016 | Sommer | H01M 10/056 429/144 |
| 2016/0211498 A1* | 7/2016 | Kim | H01M 10/0565 |
| 2020/0328423 A1* | 10/2020 | Li | H01M 4/381 |

FOREIGN PATENT DOCUMENTS

| | | |
|---|---|---|
| JP | 4438141 B2 | 3/2010 |
| KR | 101417302 B1 | 7/2014 |
| KR | 101518587 A | 5/2015 |
| KR | 101546201 B1 | 8/2015 |
| KR | 101705267 B1 | 2/2017 |
| KR | 1020180099548 A | 9/2018 |
| KR | 101978954 B1 | 5/2019 |
| KR | 1020190079171 A | 7/2019 |
| KR | 1020190100803 A | 8/2019 |

OTHER PUBLICATIONS

Gregory T. Hitz et al., "High-rate lithium cycling in a scalable trilayer Li-garnet-electrolyte architecture," Materials Today, Jan./Feb. 2019, pp. 50-57, vol. 22.

N. Pianta et al., "A safe quasi-solid electrolyte based on a nanoporous ceramic membrane for high-energy, Lithium metal batteries, " Electrochimica Acta, 2019, pp. 1-30, doi: https://doi.org/10.1016/j.electacta.2019.07.050.

* cited by examiner

COMPOSITE SOLID ELECTROLYTE, METHOD OF PREPARING COMPOSITE SOLID ELECTROLYTE, AND ELECTROCHEMICAL BATTERY INCLUDING COMPOSITE SOLID ELECTROLYTE

CROSS-REFERENCE TO RELATED APPLICATION

This application claims priority to and the benefit of Korean Patent Application No. 10-2020-0017142, filed on Feb. 12, 2020, in the Korean Intellectual Property Office, and all the benefits accruing therefrom under 35 U.S.C. § 119, the content of which is incorporated herein in its entirety by reference.

BACKGROUND

1. Field

The present disclosure relates to a composite solid electrolyte, a method of preparing the composite solid electrolyte, and an electrochemical battery including the composite solid electrolyte.

2. Description of Related Art

Batteries having high energy density and excellent safety have been developed due to industrial demand.

For example, lithium-ion batteries have been put into practical use not only in the fields of information-related devices and communication devices, but also in the automotive field. In the automotive field, safety is especially important.

Lithium-ion batteries may use an electrolytic solution containing a flammable organic solvent, and thus, if a short circuit occurs, there is a possibility of overheating and the occurrence of fires.

Accordingly, all-solid batteries using solid electrolytes have been proposed instead of electrolytic solutions.

All-solid batteries do not use a flammable organic solvent, and even if a short circuit occurs, the possibility of causing a fire or an explosion may be greatly reduced. Therefore, such all-solid batteries may greatly improve safety, as compared with lithium-ion batteries using an electrolytic solution.

To provide a large capacity in all-solid batteries, a solid electrolyte having a decreased thickness may be used. However, a solid electrolyte having a decreased thickness may have reduced mechanical strength, low density, and reduced uniformity, which may degrade battery characteristics. In addition, in order to help commercialize all-solid batteries having a large capacity, the slow migration of lithium ions between an electrode and the solid phase of a solid electrolyte could be improved. Thus there remains a need for an improved electrolyte material.

SUMMARY

Provided is a composite solid electrolyte having improved lithium ion mobility.

Provided is a method of preparing the composite solid electrolyte.

Provided is an electrochemical battery having improved cell performance by employing the composite solid electrolyte.

Additional aspects will be set forth in part in the description which follows and, in part, will be apparent from the description.

According to an aspect of an embodiment, a composite solid electrolyte includes: a porous nanostructure; and a solid electrolyte disposed on a surface of the porous nanostructure, wherein the composite solid electrolyte satisfies Equation 1

$$0 < T_{SE}/D < 4, \quad \text{Equation 1}$$

wherein $T_{SE}$ is a thickness of the solid electrolyte, and D is an average diameter of pores of the porous nanostructure.

According to an aspect of an embodiment, an electrochemical battery includes: a positive electrode layer; a negative electrode layer; and a solid electrolyte layer disposed between the positive electrode layer and the negative electrode layer, wherein the solid electrolyte layer includes the composite solid electrolyte.

According to an aspect of an embodiment, a method of preparing a composite solid electrolyte includes: mixing a solid electrolyte, a solvent, and optionally a binder to form a mixture; and providing a solid electrolyte on a surface of a porous nanostructure.

Also disclosed is a composite solid electrolyte comprising: a porous nanostructure; a solid electrolyte disposed on a surface of the porous nanostructure; and a liquid electrolyte present in a pore of the porous nanostructure, wherein the liquid electrolyte comprises an ionic liquid and a lithium salt, wherein a thickness of the solid electrolyte is in a range of about 30 nanometers to about 240 nanometers, wherein an average diameter of pores of the porous nanostructure is in a range of about 10 nanometers to about 100 nanometers, and wherein a pore density of the porous nanostructure is in a range of about $5 \times 10^8$ reciprocal square centimeters to about $1.6 \times 10^{11}$ reciprocal square centimeters.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
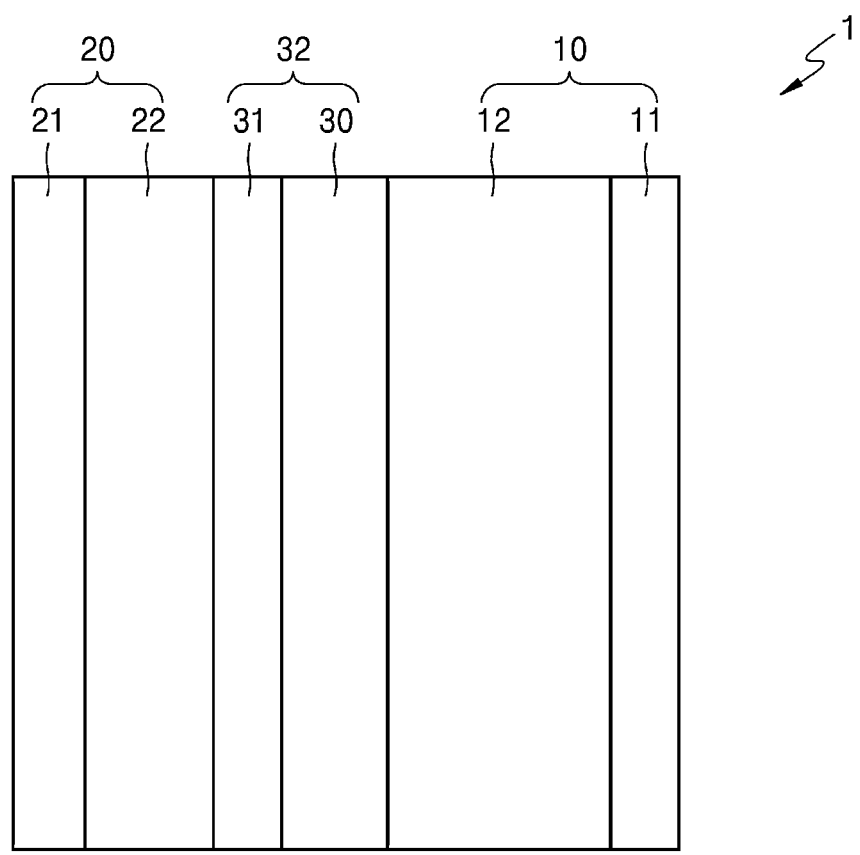
FIG. 1 is a schematic view illustrating an embodiment of a structure of an all-solid secondary battery.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element is referred to as being "on" another element, it can be directly on the other element or intervening elements may be present therebetween. In contrast, when an element is referred to as being "directly on" another element, there are no intervening elements present.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a composite solid electrolyte according to an embodiment, a method of preparing the composite solid electrolyte, and an electrochemical battery including the composite solid electrolyte will be described in further detail.

Provided is a composite solid electrolyte including a porous nanostructure and a solid electrolyte disposed on a surface, e.g., at least one surface, of the porous nanostructure, wherein an average diameter (D) of pores of the porous nanostructure and a thickness ($T_{SE}$) of the solid electrolyte satisfy Equation 1:

$$0 < T_{SE}/D < 4, \qquad \text{Equation 1}$$

The composite electrolyte may further include a liquid electrolyte.

The liquid electrolyte may further include an ionic liquid, a lithium salt, an organic solvent, or a combination thereof.

To help commercialize all-solid batteries having a large capacity, decreasing the thickness ($T_{SE}$) of the solid electrolyte is desired. A solid electrolyte having a decreased thickness may be formed by a tape-casting process. However, a solid electrolyte having a decreased thickness may have a reduced mechanical strength, a low density, and a reduced uniformity, which may degrade characteristics of an electrochemical battery.

In addition, in order to provide an all-solid battery having a high energy density, slow lithium ion mobility between the solid phase of an electrode and the solid phase of a solid electrolyte desirably would be improved. To this end, the positive electrode may be impregnated with a liquid electrolyte containing an ionic liquid. However, when preparing a positive electrode, because a viscosity of a mixture containing an ionic liquid may be high, wettability of the mixture to the positive electrode may not be sufficient, and the mixture containing an ionic liquid may leak outside of the positive electrode, as charge/discharge cycles are repeated. In addition, as the liquid electrolyte containing an ionic liquid is disposed between a positive electrode and an electrolyte, a pathway of continuous migration of lithium ions may be provided, however, due to the fluidity of the liquid, the liquid electrolyte may freely move within a battery. For this reason, a migration pathway of lithium ions may be blocked, and a chemical reaction with other components of the battery may be caused, which may degrade characteristics of the electrochemical battery.

Therefore, to resolve the foregoing problems, the present inventors prepared a composite solid electrolyte having improved ion conductivity, which may decrease or prevent leakage of a liquid electrolyte containing an ionic liquid impregnated in a positive electrode outside of the positive electrode, by using a porous nanostructure serving as a carrier of the liquid electrolyte supporting the ionic liquid and as a supporter for a solid electrolyte having a decreased thickness, and by controlling a ratio ($T_{SE}/D$) of a thickness ($T_{SE}$) of the solid electrolyte to an average diameter (D) of pores of the porous nanostructure, such that lithium ion mobility between the solid phase of an electrode and a solid phase of the solid electrolyte having a decreased thickness was improved.

A porous nanostructure of a composite solid electrolyte is an ultrathin structure having a pore, and the porous nanostructure may be used as a liquid electrolyte carrier layer and a solid electrolyte template having a decreased thickness. When such a porous nanostructure is used, the solid electrolyte may have a large area and having a decreased thickness.

An average diameter (D) of pores of the porous nanostructure may be in a range of about 10 nanometers (nm) to about 100 nm, for example, about 20 nm to about 100 nm, or, for example, about 40 nm to about 100 nm. An average diameter of pores may be measured by a transmission electron microscopy ("TEM"), a scanning electron microscopy ("SEM"), or Brunauer-Emmett-Teller ("BET") method. When an average diameter of pores of the porous nanostructure is within any of these ranges, the composite solid electrolyte located thereon may have good tightness characteristics.

According to an embodiment, the porous nanostructure may be an ordered porous structure having a uniform pore distribution.

A thickness ($T_{PN}$) of the porous nanostructure may be 100 micrometers (μm) or less, for example, about 30 nm to about 100 μm, about 10 μm to about 99 μm, about 20 μm to about 80 μm, about 30 μm to about 70 μm, or about 40 μm to about 60 μm. In an embodiment, a porous nanostructure may have a thickness of about 5,000 nm to about 100,000 nm. When a thickness ($T_{PN}$) of the porous nanostructure is within any of these ranges, the composite solid electrolyte may have a good mechanical strength. The thickness ($T_{PN}$) of the porous nanostructure is measured in a stacking direction of the porous nanostructure and the solid electrolyte, e.g., a direction that is orthogonal or substantially orthogonal to a surface of the porous nanostructure, orthogonal or substantially orthogonal to a surface of the solid electrolyte, or orthogonal or substantially orthogonal to a surface of the porous nanostructure and orthogonal or substantially orthogonal to a surface of the solid electrolyte.

A thickness ($T_{SE}$) of the solid electrolyte may be in a range of about 10 nm to about 500 nm, or, for example, about 40 nm to about 240 nm. When thicknesses of the porous nanostructure and the solid electrolyte are each within any of these ranges, an electrochemical battery having good ion conductivity and cycle characteristics may be prepared. The thickness ($T_{SE}$) of the solid electrolyte is measured in a stacking direction of the porous nanostructure and the solid electrolyte, e.g., a direction that is orthogonal or substantially orthogonal to a surface of the porous nanostructure, orthogonal or substantially orthogonal to a surface of the solid electrolyte, or orthogonal or substantially orthogonal to a surface of the porous nanostructure and orthogonal or substantially orthogonal to a surface of the solid electrolyte.

In an embodiment, an average diameter of pores of the porous nanostructure may be in a range of about 10 nm to about 100 nm, and a thickness ($T_{SE}$) of the solid electrolyte may be in a range of about 30 nm to about 240 nm.

A ratio of a thickness ($T_{PN}$) of the porous nanostructure to a thickness ($T_{SE}$) of the solid electrolyte may be in a range of about 3:1 to about 10,000:1, for example, about 10:1 to about 10,000:1.

In the composite solid electrolyte according to an embodiment, $T_{SE}/D$ may be, for example, in a range of about 0.1 to about 3.5, about 0.2 to about 3, about 0.2 to about 2.4, about 0.2 to about 2, about 0.4 to about 2.4, or about 0.8 to about 2.4. For calculating $T_{SE}/D$, the thickness ($T_{SE}$) and the diameter (D) are provided in the same units. For example, for calculating $T_{SE}/D$, the thickness ($T_{SE}$) and the diameter (D) may both provided, e.g., measured, in nanometers.

When $T_{SE}/D$ is within any of these ranges, an all-solid secondary battery employing the composite solid electrolyte may have good drivability.

A pore density of the porous nanostructure may be in a range of about $5\times10^8$ reciprocal square centimeters ($cm^{-2}$) to about $1.6\times10^{11}$ $cm^{-2}$. When a porous nanostructure having such a pore density is used, good liquid electrolyte-impregnating ability may be obtained.

As porosity of the porous nanostructure may be in a range of about 12% to about 15%, for example, about 12% to about 14%. When a porous nanostructure having such a porosity is used, good liquid electrolyte-impregnating ability may be obtained.

Porosity can be measured using an electron scanning microscope. Also, porosity can be measured using a porosimeter. Porosity may be measured by for example, 3d topology, Brunauer-Emmett-Teller (BET), Mercury intrusion porosimetry (MIP) or mercury porosity analysis. For example, a method of measuring porosity such as mercury intrusion porosimetry (MIP) or mercury porosity analysis may be used. The porosimeter is a device for measuring the porosity of the material, e.g., using mercury, and it is possible to measure porosity and pore size by mercury penetration into the pores of the material.

The porous nanostructure may be an ionic insulator and an electrical insulator. The porous nanostructure may have a lithium ion conductivity of about $1\times10^{-6}$ S/cm to about $1\times10^{-3}$ S/cm, about $5\times10^{-6}$ S/cm to about $5\times10^{-4}$ S/cm, or about $1\times10^{-5}$ S/cm to about $1\times10^{-4}$ S/cm. The porous nanostructure may have an electrical conductivity about $1\times10^{-17}$ S/cm to about $1\times10^{-8}$ S/cm, about $1\times10^{-16}$ S/cm to about $1\times10^{-6}$ S/cm, or about $1\times10^{-15}$ S/cm to about $1\times10^{-16}$ S/cm.

The porous nanostructure may be an anodic aluminum oxide ("AAO"), yttria-stabilized zirconia ("YSZ"), zeolite, porous silica gel, zirconia, titania, or a combination thereof.

The composite solid electrolyte according to an embodiment may have dense membrane properties of decreased liquid permeability or liquid impermeableness due to having the foregoing composition.

The composite solid electrolyte according to an embodiment may contain a liquid electrolyte upon preparation of all-solid batteries by having the foregoing porous nanostructure.

The liquid electrolyte may contain an ionic liquid, a lithium salt, an organic solvent, or a combination thereof. When such a liquid electrolyte and a composite solid electrolyte is used, even when a charge/discharge cycle is repeated, leakage of a liquid electrolyte outside of the positive electrode may be decreased or prevented, and lithium mobility in positive electrode may be effectively improved.

A positive electrode in the all-solid battery according to an embodiment may be a composite positive electrode containing an ionic liquid, a lithium salt, and an organic solvent, or a combination thereof.

A content of the ionic liquid in the composite positive electrode may be, based on 100 parts by weight of a lithium salt, in a range of about 1 part to about 50 parts by weight, for example, about 1 part to about 40 parts by weight, about 5 parts to about 30 parts by weight, about 10 parts to about 30 parts by weight, or about 10 parts to about 20 parts by weight. When a content of the ionic liquid is within any of these ranges, an interfacial resistance between the positive electrode and the solid electrolyte may be reduced, and conductivity of the positive electrode may be greatly improved.

The ionic liquid may be an ionic material containing cations and anions that is melted at room temperature (25° C.). The ionic liquid may include a cation of imidazolium, ammonium, pyrrolidinium, or piperidinium, for example, and an anion of bis(fluorosulfonyl)imide, fluorosufonylamide, fluoroborate, or fluorophosphate, for example. Examples of the cation include alkyl ammonium such as triethyl ammonium, imidazolium such as ethylmethyl imidazolium or butylmethyl imidazolium, or pyrrolidinium such as 1-methyl-1-propyl pyrrolidinium. Examples of the anion include bis(trifluoromethylsulfonyl)imide ("TFSI"), bis(pentafluoroethylsufonyl)imide ("BETI"), tetrafluoroborate ($BF_4^-$), or hexafluorophosphate ($PF_6^-$).

The ionic liquid may be, for example, a compound represented by Formula 1, or a compound represented by Formulae 2 to 7:

Formula 1

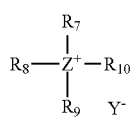

wherein, in Formula 1, Z may be N or P, and $R_7$, $R_8$, $R_9$, and $R_{10}$ may each independently be an unsubstituted or substituted $C_1$-$C_{30}$ alkyl group, an unsubstituted or substituted $C_6$-$C_{30}$ aryl group, an unsubstituted or substituted $C_3$-$C_{30}$ heteroaryl group, an unsubstituted or substituted $C_4$-$C_{30}$ cycloalkyl group, or an unsubstituted or substituted $C_3$-$C_{30}$ heterocycloalkyl group.

Formula 2

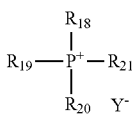

Formula 3

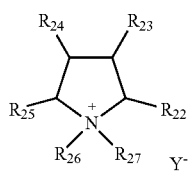

Formula 4

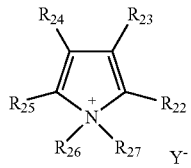

Formula 5

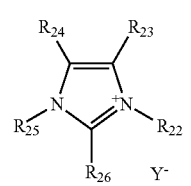

Formula 6

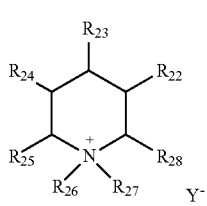

Formula 7

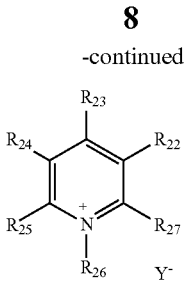

wherein, in Formula 2, $R_{18}$, $R_{19}$, $R_{20}$, and $R_{21}$ may each independently be an unsubstituted or substituted $C_1$-$C_{30}$ alkyl group, an unsubstituted or substituted $C_6$-$C_{30}$ aryl group, an unsubstituted or substituted $C_3$-$C_{30}$ heteroaryl group, an unsubstituted or substituted $C_4$-$C_{30}$ cycloalkyl group, or an unsubstituted or substituted $C_3$-$C_{30}$ heterocycloalkyl group, and in Formulae 3 to 7, $R_{22}$, $R_{23}$, $R_{24}$, $R_{25}$, $R_{26}$, and $R_{27}$ may each independently be hydrogen, an unsubstituted or substituted $C_1$-$C_{30}$ alkyl group, an unsubstituted or substituted $C_6$-$C_{30}$ aryl group, an unsubstituted or substituted $C_3$-$C_{30}$ heteroaryl group, an unsubstituted or substituted $C_4$-$C_{30}$ cycloalkyl group, or an unsubstituted or substituted $C_3$-$C_{30}$ heterocycloalkyl group, and $Y^-$ in Formulae 1 to 7 may be $(C_2F_5SO_2)_2N^-$, $(C_2F_5SO_2)(CF_3SO_2)N^-$, $(CF_3SO_2)_2N^-$, $(CN)_2N^-$, or a combination thereof.

Examples of the ionic liquid include [emim]Cl/AlCl$_3$ (wherein 'emim' represents ethyl methyl imidazolium), [bmpyr]NTf2 (wherein bmpyr represents butyl methyl pyridinium), [bpy]Br/AlCl$_3$ (wherein 'bpy' represents 4,4'-bipyridine), [choline]Cl/CrCl$_3$·6H$_2$O, [Hpy(CH$_2$)$_3$pyH][NTf$_2$]$_2$ (wherein NTf$_2$ represents bistrifluoromethane sulfonimide), [emim]OTf/[hmim]I (wherein 'hmim' represents hexyl methyl imidazolium), [choline]Cl/HOCH$_2$CH$_2$OH, [Et$_2$MeN(CH$_2$CH$_2$OMe)]BF$_4$ (wherein 'Et' represents ethyl, 'Me' represents methyl), [Bu$_3$PCH$_2$CH$_2$C$_8$F$_{17}$]OTf (wherein 'OTf' represents trifluoromethane sulfonate), [bmim]PF$_6$ (wherein 'bmim' represents butyl methyl imidazolium), [bmim]BF$_4$, [omim]PF$_6$ (wherein 'omim' represents octyl methyl imidazolium), [Oct$_3$PC$_{18}$H$_{37}$]I (wherein 'Oct' represents octyl), [NC(CH$_2$)$_3$mim]NTf$_2$ (wherein 'mim' represents methyl imidazolium), [Pr$_4$N][B(CN)$_4$] (wherein 'Pr' represents propyl), [bmim]NTf$_2$, [bmim]Cl, [bmim][Me(OCH$_2$CH$_2$)$_2$OSO$_3$], [PhCH$_2$mim]OTf (wherein 'Ph' represents phenyl), [Me$_3$NCH(Me)CH(OH)Ph] NTf$_2$, [pmim][(HO)$_2$PO$_2$] (wherein 'pmim' represents propyl methyl imidazolium), [(6-Me)b quin]NTf$_2$ (wherein 'bquin' represents butyl quinolinium), [bmim][Cu$_2$Cl$_3$], [C$_{18}$H$_{37}$OCH$_2$mim]BF$_4$ (wherein 'mim' represents methyl imidazolium), [heim]PF$_6$ (wherein 'heim' represents hexyl ethyl imidazolium), [mim(CH$_2$CH$_2$O)$_2$CH$_2$CH$_2$mim][NTf$_2$]$_2$ (wherein 'mim' represents methyl imidazolium), [obim]PF$_6$ (wherein 'obim' represents octyl butyl imidazolium), [oquin]NTf$_2$ (wherein 'oquin' represents octyl quinolinium), [hmim][PF$_3$(C$_2$F$_5$)$_3$], [C$_{14}$H$_{29}$mim]Br (wherein 'mim' represents methyl imidazolium), [Me$_2$N(C$_{12}$H$_{25}$)$_2$]NO$_3$, [emim]BF$_4$, [mm(3-NO$_2$)im][dinitrotriazolate], [MeN(CH$_2$CH$_2$OH)$_3$][MeOSO$_3$], [Hex$_3$PC$_{14}$H$_{29}$]NTf$_2$ (wherein 'Hex' represents hexyl), [emim][EtOSO$_3$], [choline][ibuprofenate], [emim]NTf$_2$, [emim][(EtO)$_2$PO$_2$], [emim]Cl/CrCl$_2$, or [Hex$_3$PC$_{14}$H$_{29}$]N(CN)$_2$. Any suitable ionic liquid may be used.

Non-limiting examples of the lithium salt include LiPF$_6$, LiBF$_4$, LiCF$_3$SO$_3$, Li(CF$_3$SO$_2$)$_2$N, Li(CF$_3$SO$_2$)$_3$C, LiC$_2$F$_5$SO$_3$, Li(FSO$_2$)$_2$N, LiC$_4$F$_9$SO$_3$, LiN(SO$_2$CF$_2$CF$_3$)$_2$, LiN(CN)$_2$, compounds represented by Formulae 8 to 11, or a combination thereof, and a concentration of the lithium salt may be in a range of about 0.01 molar (M) to about 5 M, for example, about 0.1 M to about 3 M or about 0.1 M to about 2 M.

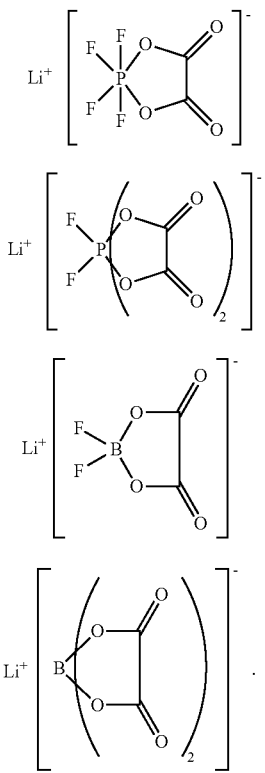

Formula 8

Formula 9

Formula 10

Formula 11

The organic solvent may include a carbonate compound, a glyme compound, and a dioxolane compound. For example, the carbonate compound may be ethylene carbonate, propylene carbonate, dimethyl carbonate, fluoroethylene carbonate, diethyl carbonate, or ethyl methyl carbonate. The glyme compound may be, for example, poly(ethylene glycol)dimethyl ether ("PEGDME", polyglyme), tetra(ethylene glycol)dimethyl ether ("TEGDME"; tetraglyme), tri(ethylene glycol)dimethyl ether (triglyme), poly(ethylene glycol)dilaurate ("PEGDL"), poly(ethylene glycol)monoacrylate ("PEGMA"), poly(ethylene glycol)diacrylate ("PEGDA"), or a combination thereof.

The dioxolane compound may be, for example, 3-dioxolane, 4,5-diethyl-dioxolane, 4,5-dimethyl-dioxolane, 4-methyl-1,3-dioxolane, 4-ethyl-1,3-dioxolane, or a combination thereof.

The organic solvent may be 2,2-dimethoxy-2-phenylacetophenone, dimethoxyethane, diethoxyethane, tetrahydrofuran, γ-butyrolactone, or trimethyl phosphate.

When the composite solid electrolyte and the composite positive electrode are used, an increase in internal resistance of the solid secondary battery may be suppressed.

The composite positive electrode may include a plurality of positive active material particles, and a positive electrode electrolyte may be included among the plurality of positive active material particles. The positive electrode electrolyte may be, for example, the liquid electrolyte described above.

The positive electrode may include a positive active material layer including a positive active material, and the positive electrode electrolyte may be present in a pore of a positive active material layer, a surface of a positive active material layer, or a combination thereof. Therefore, an interfacial resistance among the positive active material particles may be reduced to thereby result in a decrease in internal resistance of a solid secondary battery employing such a positive electrode. In addition, the positive electrode may have an improved mixture density. Such a positive electrode may be manufactured by stacking a positive active material layer on a positive electrode current collector and impregnating the positive active material layer in a positive electrode electrolyte.

A mixture density of the positive active material layer including a positive active material and a positive electrode electrolyte may be, for example, 3.0 grams per cubic centimeter (g/cm$^3$) or greater, 3.1 g/cm$^3$ or greater, 3.2 g/cm$^3$ or greater, or, for example, about 3.2 g/cm$^3$ to about 3.5 g/cm$^3$. An all-solid secondary battery employing such a positive electrode may have an improved energy density.

According to an aspect of an embodiment, an electrochemical battery includes: a positive electrode layer; a negative electrode layer; and a solid electrolyte layer disposed therebetween, and the solid electrolyte layer may be the composite solid electrolyte according to an embodiment.

A solid electrolyte of the composite solid electrolyte may be, for example, a sulfide solid electrolyte, an oxide-based solid electrolyte, or a combination thereof. Any suitable inorganic solid electrolyte may be used.

The solid electrolyte may be, for example, an oxide-based solid electrolyte. The solid electrolyte may have a lithium ion conductivity of about $1 \times 10^{-6}$ S/cm to about $1 \times 10^{-3}$ S/cm, about $5 \times 10^{-6}$ S/cm to about $5 \times 10^{-4}$ S/cm, or about $1 \times 10^{-5}$ S/cm to about $1 \times 10^{-4}$ S/cm.

Ion conductivity may be determined by a complex impedance method at 20° C., further details of which can be found in J.-M. Winand et al., "Measurement of Ionic Conductivity in Solid Electrolytes," Europhysics Letters, vol. 8, no. 5, p. 447-452, 1989.

Also, the solid electrolyte may have an electrical conductivity about $1 \times 10^{-6}$ S/cm to about $1 \times 10^{-5}$ S/cm, about $1 \times 10^{-8}$ S/cm to about $5 \times 10^{-6}$ S/cm, or about $5 \times 10^{-8}$ S/cm to about $1 \times 10^{-7}$ S/cm. The electrical conductivity can be determined according to ASTM B-193, "Standard Test Method for Resistivity of Electrical Conductor Materials," e.g., at 20° C., or according to ASTM E-1004, "Standard Test Method for Determining Electrical Conductivity Using the Electromagnetic (Eddy-Current) Method," e.g., at 20° C.

The oxide-based solid electrolyte may be, for example, lithium phosphorus oxynitride ("LiPON", $Li_xPO_yN_z$, wherein 0<x<1, 0<y<1, and 0<z<1, $Li_xP_yO_zN_K$ wherein 2.7≤x≤3.3, 0.8≤y≤1.2, 3.5≤z≤3.9 and 0.1≤k≤0.5, $Li_wPO_{x-}N_yS_z$ (wherein 0<w<1, 0<x<1, 0<y<1, and 0<z<1, $Li_{1+x+y}Al_xTi_{2-x}Si_yP_{3-y}O_{12}$ (wherein 0<x<2 and 0y<3, $BaTiO_3$, $Pb(Zr_aTi_{1-a})O_3$ ("PZT") wherein 0≤a≤1, $Pb_{1-x}La_xZr_{1-y}Ti_yO_3$ ("PLZT") wherein 0≤x<1 and 0≤y<1, $Pb(Mg_{1/3}Nb_{2/3})O_3$—$PbTiO_3$, ("PMN-PT") $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, $SiC$, lithium phosphate $Li_3PO_4$, lithium titanium phosphate $Li_xTi_y(PO_4)_3$ wherein 0<x<2 and 0<y<3), lithium aluminum titanium phosphate ($Li_xAl_yTi_z(PO_4)_3$, wherein 0<x<2, 0<y<1, and 0<z<3, $Li_{1+x+y}(Al_aGa_{1-a})_x(Ti_bGe_{1-b})_{2-x}Si_yP_{3-y}O_{12}$ (wherein 0≤x≤1, 0≤y≤1, 0≤a≤1, and 0≤b≤1, lithium lanthanum titanate ($Li_xLa_yTiO_3$ wherein 0<x<2 and 0<y<3), lithium germanium thiophosphate ($Li_xGe_yP_zS_w$, wherein 0<x<4, 0<y<1, 0<z<1, and 0<w<5), lithium nitride-based glass ($Li_xN_y$ wherein 0<x<4 and 0<y<2), $SiS_2$ ($Li_xSi_yS_z$ wherein 0<x<3, 0<y<2, and $0<z<4$), a $P_2S_5$-based glass, $Li_xP_yS_z$, wherein $0<x<3$, $0<y<3$, and $0<z<7$, $Li_2O$, LiF, LiOH, $Li_2CO_3$, $LiAlO_2$, a $Li_2O$—$Al_2O_3$—$SiO_2$—$P_2O_5$—$TiO_2$—$GeO_2$-based ceramic, a garnet ceramic of the formula $Li_{3+x}La_3M_2O_{12}$ (wherein M is Te, Nb, or Zr, and x may be an integer from 1 to 10), or a combination thereof.

The oxide-based solid electrolyte may be, for example, lithium phosphorus oxynitride ($Li_xPO_yN_z$, "LiPON").

$Li_wPO_xN_yS_z$ may be, for example, x may be 2.8, 2y=3z, $0.16 \leq z \leq 0.46$. $Li_wPO_xN_yS_z$ may be, for example, $(2x+3y+2z)=(5+w)$, $3.2 \times 3.8$, $0.13 \leq y \leq 0.4$, $0 \leq z \leq 0.2$, and $2.9 \leq w \leq 3.3$.

The composite solid electrolyte according to an embodiment may further contain an inorganic solid electrolyte. The inorganic solid electrolyte may be, for example, a sulfide solid electrolyte.

The solid electrolyte may be, for example, a sulfide solid electrolyte. Examples of the sulfide solid electrolyte material may be, for example, $Li_2S$—$P_2S_5$, $Li_2S$—$P_2S_5$—LiX, wherein X is a halogen, $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$, wherein m and n are positive integers, and Z is Ge, Zn, or Ga, $Li_2S$—$GeS_2$, $Li_2S$—$SiS_2$—$Li_3PO_4$, $Li_2S$—$SiS_2$—$Li_pMO_q$, wherein p and q are positive integers and M is P, Si, Ge, B, Al, Ga, or In, or a combination thereof. The sulfide solid electrolyte may be prepared by performing a melt quenching method or a mechanical milling method on a start material, e.g., $Li_2S$ or $P_2S_5$. Subsequently, heat treatment may be performed thereon. The sulfide solid electrolyte may be an amorphous sulfide solid electrolyte, a crystalline sulfide solid electrolyte, or a combination thereof.

In addition, the solid electrolyte may include, for example, sulfur (S), phosphorus (P), and lithium (Li), as constituting elements, of the sulfide solid electrolyte materials described above. One or more additional, optional elements, such as a halogen or Si and O, may also be included as constituting elements of the sulfide solid electrolyte material. In an embodiment, the solid electrolyte may be a material including $Li_2S$—$P_2S_5$. When a material including $Li_2S$—$P_2S_5$ is used as the sulfide solid electrolyte material constituting the solid electrolyte, a mixed molar ratio of $Li_2S$ to $P_2S_5$ ($Li_2S:P_2S_5$) may be, for example, about 50:50 to about 90:10. In an embodiment, the sulfide solid electrolyte included in a solid electrolyte may be an argyrodite-type compound including $Li_{7-x}PS_{6-x}Cl_x$, $0<x<2$, $Li_{7-x}PS_{6-x}Br_x$, $0<x<2$, $0<x<2$, or a combination thereof.

The sulfide solid electrolyte of an argyrodite-type may be, for example, $Li_6PS_5Cl$, $Li_6PS_5Br$, $Li_6PS_5I$, or a combination thereof.

The positive active material may include, for example, a lithium transition metal oxide having a layered rock-salt structure. In an embodiment, an electrode may be, for example, a negative electrode including a negative active material. The negative active material may include, for example, an amorphous carbon, a crystalline carbon, a metal, or a metalloid capable of forming an alloy or a compound with lithium.

The electrochemical battery may be, for example, an all-solid secondary battery.

FIG. 1 is a schematic view illustrating an embodiment of a structure of an all-solid secondary battery.

As shown in FIG. 1, an all-solid secondary battery 1 may include: a negative electrode 20 including a negative active material layer 22; a positive electrode 10 including a positive active material layer 12; and a composite solid electrolyte 32 disposed between the negative electrode 20 and the positive electrode 10. The composite solid electrolyte 32 may include a porous nanostructure 30 and a solid electrolyte 31. The porous nanostructure 30 may be disposed adjacent to, e.g., directly on, the positive electrode 10. The positive electrode 10 may be a composite positive electrode containing a liquid electrolyte containing a lithium salt, an ionic liquid, or a combination thereof. The porous nanostructure 30 may be disposed adjacent to, e.g., directly on, the positive electrode 10, and an electrolyte containing an ionic liquid impregnated in the positive electrode may be contained in the porous nanostructure. Accordingly, a problem of insufficient wettability of a liquid electrolyte with respect to a positive electrode and leakage of a mixture including an ionic liquid to the outside, as charge/discharge cycles are repeated, may be decreased or prevented.

Positive Electrode

The positive electrode 10 may include a positive electrode current collector 11 and a positive active material layer 12. The positive electrode 10 may include a positive electrode composite electrolyte. Although not seen in FIG. 1, the positive electrode composite electrolyte may be present at an interface between the positive electrode 10 and the composite solid electrolyte 32, and the positive electrode composite electrolyte may be present in a solid state around the positive electrode 10.

For example, the positive active material layer 12 may include a positive active material and a positive electrode composite electrolyte. The positive active material may be any suitable positive active material capable of reversible adsorbing and desorbing of lithium ions. For example, the positive active material may be a lithium transition metal oxide, such as lithium cobalt oxide ("LCO"), lithium nickel oxide, lithium nickel cobalt oxide, lithium nickel cobalt aluminum oxide ("NCA"), lithium nickel cobalt manganese oxide (NCM), lithium manganate, or lithium iron phosphate, nickel sulfide, copper sulfide, lithium sulfide, iron oxide, or vanadium oxide. Any suitable positive active material may be used. Two or more different positive active materials may be used. The positive active material may be, for example, lithium cobalt oxide ("LCO") having good high-voltage stability.

The lithium transition metal oxide may be, for example, a compound represented by one of the following formulae: $Li_aA_{1-b}B'_bD_2$, wherein $0.90 \leq a \leq 1$ and $0 \leq b \leq 0.5$; $Li_aE_{1-b}B'_bO_{2-c}D_c$, wherein $0.90 \leq a \leq 1$, $0 \leq b \leq 0.5$, and $0 \leq c \leq 0.05$, $LiE_{2-b}B'_bO_{4-c}D_c$, wherein $0 \leq b \leq 0.5$ and $0 \leq c \leq 0.05$, $Li_aNi_{1-b-c}Co_bB'_cD_\alpha$, wherein $0.90 \leq a \leq 1$, $0 \leq b \leq 0.5$, $0 \leq c \leq 0.05$, and $0 < \alpha \leq 2$, $Li_aNi_{1-b-c}Co_bB'_cO_{2-\alpha}F'_\alpha$, wherein $0.90 \leq a \leq 1$, $0 \leq b \leq 0.5$, $0 \leq c \leq 0.05$, and $0 < \alpha < 2$; $Li_aNi_{1-b-c}Co_bB'_cO_{2-\alpha}F'_2$, wherein $0.90 \leq a \leq 1$, $0 \leq b \leq 0.5$, $0 \leq c \leq 0.05$, and $0 < \alpha < 2$; $Li_aNi_{1-b-c}Mn_bB'_cD_\alpha$, wherein $0.90 \leq a \leq 1$, $0 \leq b \leq 0.5$, $0 \leq c \leq 0.05$, and $0 < \alpha < 2$, $Li_aNi_{1-b-c}Mn_bB'_cO_{2-\alpha}F'_\alpha$, wherein $0.90 \leq a \leq 1$, $0 \leq b \leq 0.5$, $0 \leq c \leq 0.05$, and $0 < \alpha < 2$; $Li_aNi_{1-b-c}Mn_bB'_cO_{2-\alpha}F'_2$, wherein $0.90 \leq a \leq 1$, $0 \leq b \leq 0.5$, $0 \leq c \leq 0.05$, and $0 < \alpha < 2$; $Li_aNi_bE_cG_dO_2$, wherein $0.90 \leq a \leq 1$, $0 \leq b \leq 0.9$, and $0 \leq c \leq 0.5$, $0.001 \leq d \leq 0.1$, $Li_aNi_bCo_cMn_dGeO_2$, wherein $0.90 \leq a \leq 1$, $0 \leq b \leq 0.9$, $0 \leq c \leq 0.5$, $0 \leq d \leq 0.5$, and $0.001 \leq e \leq 0.1$; $Li_aNiG_bO_2$, wherein $0.90 \leq a \leq 1$ and $0.001 \leq b \leq 0.1$, $Li_aCoG_bO_2$, wherein $0.90 \leq a \leq 1$ and $0.001 \leq b \leq 0.1$, $Li_aMnG_bO_2$, wherein $0.90 \leq a \leq 1$ and $0.001 \leq b \leq 0.1$, $Li_aMn_2G_bO_4$, wherein $0.90 \leq a \leq 1$ and $0.001 \leq b \leq 0.1$, $QO_2$; $QS_2$; $LiQS_2$; $V_2O_5$, $LiV_2O_5$; $LiI'O_2$, $LiNiVO_4$; $Li_{(3-f)}J_2(PO_4)_3$, wherein $0 \leq f \leq 2$, $Li_{(3-f)}Fe_2(PO_4)_3$, wherein $0 \leq f \leq 2$, or $LiFePO_4$. In the formulae, A may be nickel (Ni), cobalt (Co), manganese (Mn), or a combination thereof; B' may be aluminum (Al), Ni, Co, Mn, chromium (Cr), iron (Fe), magnesium (Mg), strontium (Sr), vanadium (V), a rare-earth element, or a combination thereof; D may be oxygen (O), fluorine (F), sulfur (S), phosphorus (P), or a combination thereof; E may be Co, Mn, or a combination thereof; F' may be F, S, P, or a combination thereof; G may be Al, Cr, Mn, Fe, Mg, lanthanum (La), cerium (Ce), Sr, V, or a combination thereof; Q may be titanium (Ti), molybdenum (Mo), Mn, or a combination thereof; I' may be Cr, V, Fe, scandium (Sc), yttrium (Y), or a combination thereof; and J may be V, Cr, Mn, Co, Ni, copper (Cu), or a combination thereof. A compound added with a coating layer formed on one of these compounds may also be used, and a mixture of these compounds or a compound added with a coating layer may also be used. In an embodiment, the coating layer added on a surface of these compounds may include an oxide of the coating element, a hydroxide of the coating element, an oxyhydroxide of the coating element, an oxycarbonate of the coating element, a hydroxycarbonate of the coating element, or a combination thereof. In an embodiment, these compounds constituting the coating layer may be amorphous or crystalline. In an embodiment, the coating element included in the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a combination thereof. A method of forming a coating layer desirably does not affect physical properties of the positive active material. The coating method may be, for example, a spray coating method or a dipping method.

The positive active material may include, for example, a lithium salt of a transition metal oxide having a layered rock salt type structure in the lithium transition metal oxide. The term "layered rock salt type structure" as used herein refers to a structure in which an oxygen atom layer and a metal atom layer are alternately and regularly arranged in <111> direction of a cubic rock salt type structure and the respective atom layer thus form a two-dimensional plane. The term "cubic rock salt type structure" as used herein refers to a NaCl type structure as one of crystal structures in which face-centered cubic lattices respectively formed of anions and cations are shifted by only a half of the ridge of each unit lattice. Examples of the lithium transition metal oxide having a layered rock salt type structure may be a ternary lithium transition metal oxide represented by $LiNi_xCo_yAl_zO_2$ ("NCA") or $LiNi_xCo_yMn_zO_2$ ("NCM"), wherein x, y, and z are each independently $0<x<1$, $0<y<1$, $0<z<1$, and $x+y+z=1$. When the positive active material includes the ternary lithium transition metal oxide having a layered rock salt type structure, the all-solid secondary battery 1 may have further improved energy density and thermal stability.

The positive active material may be, for example, lithium cobalt oxide ("LCO") having good high-voltage stability.

The positive active material may be covered by a coating layer as described above. The coating layer may be any suitable covering layer for use as a coating layer of a positive active material in solid secondary batteries. Examples of the coating layer include $Li_2O$—$ZrO_2$.

For example, when the positive active material includes nickel (Ni) as a ternary lithium transition metal oxide such as NCA or NCM, the capacity density of the all-solid secondary battery 1 may be increased, thereby allowing a decrease in metal elution of a positive active material while charging. Consequently, the all-solid secondary battery 1 may have improved cycle characteristics while charging.

The positive active material may be, for example, in a particle shape, such as a spherical shape or an oval-spherical shape. A particle diameter of the positive active material is not particularly limited. The diameter may be within a range applicable to a positive active material of a solid secondary battery. A content of the positive active material of the positive electrode 10 is not particularly limited. The content may be within a range applicable to a positive electrode of a solid secondary battery.

Examples of the positive electrode current collector 11 include a plate or a foil including indium (In), copper (Cu), magnesium (Mg), stainless steel, titanium (Ti), iron (Fe) cobalt (Co), nickel (Ni), zinc (Zn), aluminum (Al), germanium (Ge), lithium (Li), or an alloy thereof. The positive electrode current collector 11 may not be included.

The positive electrode 10 may further include additives, for example, a conductive agent, a binder, a filler, a dispersing agent, and an ion conductive agent, in addition to the positive active material and the solid electrolyte. The conductive agent may be acetylene black, Ketjen black, natural graphite, artificial graphite, carbon black, acetylene black, Ketjen black, carbon fiber, and metal powder and metal fiber of, e.g., copper, nickel, aluminum, or silver. In an embodiment, a, e.g., at least one, conductive material such as a polyphenylene derivative may be used. Two or more different conductive materials may be used. The binder may be, for example, a vinylidene fluoride/hexafluoropropylene copolymer, polyvinylidene fluoride ("PVDF"), polyacrylonitrile, polymethyl methacrylate, polytetrafluoroethylene, or a combination thereof or a styrene butadiene rubber polymer. Moreover, a coating agent, a dispersing agent, or an ion conductive agent that may be included in the positive electrode 10 may be any suitable material for an electrode in a solid secondary battery.

A thickness ($T_{PN}$) of the positive electrode may be in a range of about 0.1 μm to about 100 μm. A thickness ($T_{SE}$) of the solid electrolyte may be in a range of about 1 nm to about 1,000 μm, for example, about 0.1 μm to about 100 μm, about 0.5 μm to about 70 μm, about 1 μm to about 50 μm, or about 1 μm to about 20 μm.

Negative Electrode

The negative electrode 20 may include a negative electrode current collector 21 and a negative active material layer 22. A negative active material included in the negative active material layer 22 may have, for example, a particle shape. An average particle diameter of negative active materials having a particle shape may be, for example, 4 μm or less, 3 μm or less, 2 μm or less, 1 μm or less, or 900 nm or less. An average particle diameter of negative active materials having a particle shape may be, for example, about 10 nm to about 4 μm, about 10 nm to about 3 μm, about 10 nm to about 2 μm, about 10 nm to about 1 μm, or about 10 nm to about 900 nm. When the negative active material has an average particle diameter within any of these ranges, upon charging and discharging of a battery, reversible absorbing of lithium, and/or desorbing of lithium, or a combination thereof may be facilitated. An average particle diameter of the negative active materials may be, for example, a median diameter (D50) measured by using a laser particle-size analyzer.

The negative active material included in the negative active material layer 22 may be, for example, a carbonaceous negative active material, a non-carbonaceous negative active material, or a combination thereof.

Examples of the carbonaceous negative active material may include a crystalline carbon, an amorphous carbon, or a combination thereof. Examples of the crystalline carbon may include graphite, such as natural graphite or artificial graphite that are in non-shaped, plate, flake, spherical, or fibrous form. Examples of the amorphous carbon may include soft carbon (carbon sintered at low temperatures), hard carbon, meso-phase pitch carbides, and sintered cokes. Amorphous carbon may be, for example, carbon black ("CB"), acetylene black ("AB"), furnace black ("FB"), ketjen black ("KB"), or graphene. Any suitable amorphous carbon may be used.

A metal or metalloid negative active material may be gold (Au), platinum (Pt), palladium (Pd), silicon (Si), silver (Ag), aluminum (Al), bismuth (Bi), tin (Sn), zinc (Zn), for example. Any suitable metal negative active material or metalloid negative active material capable of forming an alloy or compound with lithium may be used. For example, nickel (Ni) may not form an alloy with lithium and thus is not a metal negative active material.

A negative active material included in the negative active material layer 22 may be a non-carbonaceous negative active material. For example, the non-carbonaceous negative active material may be a metal that is alloyable with lithium, an alloy of the metal that is alloyable with lithium, an oxide of the metal that is alloyable with lithium, or a combination thereof. Examples of the metal alloyable with lithium include silicon (Si), tin (Sn), aluminum (Al), germanium (Ge), lead (Pb), bismuth (Bi), antimony (Sb), a Si—Y' alloy (wherein Y' is an alkali metal, an alkaline earth metal, a Group 13 element, a Group 14 element, a Group 15 element, a Group 16 element, a transition metal, a rare earth element, or a combination thereof, and Y' is not Si), and a Sn—Y' alloy (wherein Y' is an alkali metal, an alkaline earth-metal, a Group 13 element, a Group 14 element, a Group 15 element, a Group 16 element, a transition metal, a rare earth element, or a combination thereof, and Y' is not Sn). Y' may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), germanium (Ge), phosphorus (P), arsenic (As), antimony (Sb), bismuth (Bi), sulfur (S), selenium (Se), tellurium (Te), polonium (Po), or a combination thereof. For example, the transition metal oxide may be a lithium titanium oxide, a vanadium oxide, or a lithium vanadium oxide. Examples of the non-transition metal oxide include $SnO_2$ and $SiO_x$, wherein $0<x<2$. The non-carbonaceous negative active material may be, for example, Si, Sn, Pb, Ge, Al, $SiO_x$, wherein $0<x<2$, $SnO_y$, wherein $0<y\leq2$, $LiaTi_5O_{12}$, $TiO_2$, $LiTiO_3$, $Li_2Ti_3O_7$, or a combination thereof. Any suitable non-carbonaceous negative active material may be used.

For example, the negative electrode current collector 21 may include materials that are not reactive to lithium and do not form an alloy or a compound with lithium. Materials constituting the negative electrode current collector 21 may include, for example, copper (Cu), stainless steel, titanium (Ti), iron (Fe), cobalt (Co), and nickel (Ni). Any suitable electrode current collector may be used. The negative electrode current collector 21 may include one type of the metal described above, or an alloy of at least two metals or a coating material. The negative electrode current collector 21 may be, for example, in a plate shape or a foil shape.

The negative active material layer 22 may further include additives used in an all-solid secondary battery 1, such as a filler, a dispersing agent, a conductive agent, or a binder. The negative active material layer 22 may include, for example, a material of a filler, a dispersing agent, a conductive agent, or a binder used in the positive active material layer 12.

Composite Solid Electrolyte

As shown in FIG. 1, the composite solid electrolyte 32 may include the porous nanostructure 30 and the solid electrolyte 31 disposed between the positive electrode 10 and the negative electrode 20. The solid electrolyte 31 may further include, for example, a binder. The binder included in the solid electrolyte 31 may be, for example, styrene butadiene rubber ("SBR"), polytetrafluoroethylene, polyvinylidene fluoride, or polyethylene. Any suitable binder may be used. The binder of the solid electrolyte 31 may be identical to or different from the binder of the positive active material layer 12 and the binder of the negative active material layer 22.

The all-solid secondary battery 1 may be, for example, manufactured by preparing the positive electrode 10, the negative electrode 20, and the composite solid electrolyte 32 and stacking the positive electrode 10, the negative electrode 20, and the composite solid electrolyte 32.

Preparation of Positive Electrode

Materials constituting the positive active material layer 12, i.e., a positive active material, a conductive agent, a binder, and the like, may be mixed to prepare a slurry. The prepared slurry may be coated on the positive electrode current collector 11 to form a positive active material layer. The resulting laminate may be pressurized according as desired to prepare a positive electrode 10. The pressurizing may be performed by, for example, roll pressing, flat pressing, pressing using hydrostatic pressure, or the like. Any suitable pressurizing may be used. The pressurizing may be omitted. A mixture of materials constituting the positive active material layer 12 may be compressed to form the positive electrode 10 in a pellet shape or in a sheet shape. When the positive electrode 10 is prepared as above, the positive electrode current collector 11 may be omitted.

Preparation of Negative Electrode

Materials constituting the negative active material layer 22, i.e., a negative active material, a conductive agent, a binder, and the like, may be added to a polar or nonpolar solvent to prepare a slurry. The prepared slurry may be coated on the negative electrode current collector 21 and dried to prepare a laminate. The dried laminate may be pressurized to prepare the negative electrode 20. The pressurizing may be performed by, for example, roll pressing, flat pressing, or the like. Any suitable pressurizing may be used. The pressurizing may be performed at, for example, room temperature to a temperature lower than 90° C. or at about 20° C. to about 90° C. In an embodiment, the pressurizing may be performed at a temperature of 100° C. or higher, for example, at a temperature of about 100° C. to about 200° C. The pressurizing may be omitted. A mixture of materials constituting the negative active material layer 22 may be compressed to form the negative electrode 20 in a pellet shape or in a sheet shape. When the negative electrode 20 is prepared as above, the negative electrode current collector 21 may be omitted.

Preparation of Solid Electrolyte

The composite solid electrolyte 32 may be prepared, for example, using a solid electrolyte formed of oxide-based solid electrolyte materials and a porous nanostructure.

For example, a solid electrolyte may be used to form the solid electrolyte 31 by any suitable method for layer formation, such as deposition, aerosol deposition, cold spraying, or sputtering. In an embodiment, the solid electrolyte 30 may be prepared by pressurizing a solid electrolyte particle. In an embodiment, the solid electrolyte 31 may be prepared by mixing a solid electrolyte, a solvent, and a binder followed by coating, drying, and pressurizing.

The composite solid electrolyte according to an embodiment is prepared by providing a solid electrolyte on a, e.g., at least one, surface of a porous nanostructure.

The providing of the solid electrolyte may be performed by chemical vapor deposition, aerosol assisted physical vapor deposition, sputtering, or the like.

Examples of chemical vapor deposition include plasma-enhanced chemical vapor deposition ("PECVD"), laser assisted chemical vapor deposition ("LACVD"), or aerosol assisted chemical vapor deposition ("AACVD")

Physical vapor deposition may be, for example, vacuum evaporation, laser ablation, ion beam, or cathodic sputtering.

The deposition time may be controlled according to the average diameter of pores of the porous nanostructure. For example, when the average diameter of pores of the porous nanostructure is in a range of about 40 nm to about 100 nm, the deposition time may be controlled to be in a range of, for example, about 10 nm to about 60 nm, and under such conditions, the thickness ($T_{SE}$) of the solid electrolyte may be in a range of about 40 nm to about 240 nm.

When deposition is performed under the foregoing condition, $T_{SE}/D$ may satisfy Equation 2:

$$0 < T_{SE}/D < 6.$$ Equation 2

$T_{SE}/D$ may be, for example, less than 6, less than 5, less than 4, less than 3, in a range of about 0.1 to about 3, about 0.2 to about 2.5, about 0.4 to about 2.4, or about 0.8 to about 2.

When $T_{SE}/D$ is within any of these ranges, the all-solid battery may provide desirable characteristics.

In an embodiment, a solid electrolyte may be used to form the solid electrolyte by any suitable method for layer formation, such as deposition, aerosol deposition, cold spraying, or sputtering. In an embodiment, the composite solid electrolyte 32 may be prepared by mixing a solid electrolyte, a solvent, and a binder and coating the mixture on the porous nanostructure 30, followed by drying and pressurizing.

The porous nanostructure may be washed through ultrasonic treatment using acetone and deionized water.

In an embodiment, an AAO template may be used as the porous nanostructure to deposit a solid electrolyte by PECVD to thereby form a composite solid electrolyte. When a film is formed using a vapor deposition method on a substrate having a step difference, overhang may occur at an edge of a region where the film is formed. According to the method of preparing the composite solid electrolyte according to an embodiment, the weakness of the overhang may be used to form a dense solid electrolyte on one surface of a porous nanostructure. The porous nanostructure is maintained on the other surface of the porous nanostructure. Due to the overhang, a space for impregnating a positive electrode electrolyte may also be secured.

The other surface maintaining the porous nanostructure may be disposed to be adjacent to, e.g., directly on, a positive electrode containing a liquid electrolyte such as an ionic liquid.

The composite solid electrolyte according to an embodiment may have dense membrane properties of decreased liquid permeability or liquid impermeableness due to being prepared according to the foregoing process.

The thickness of the AAO template may be, for example, about 30 μm to about 90 μm, or, for example, 50 μm.

The solid electrolyte may be deposited using, for example, a lithium precursor, a phosphorus precursor, and $N_2$ plasma to form a LiPON electrolyte thin film.

The LiPON thin film may contain, for example, about 25 atomic percent (atom %) to about 40 atom % of Li, about 10 atom % to about 20 atom % of P, about 40 atom % to about 55 atom % of O, and about 2 atom % to about 5 atom % of N.

The LiPON thin film may contain, for example, $Li_xP_yO_zN_k$, wherein $2.7 \leq x \leq 3.3$, $0.8 \leq y \leq 1.2$, $3.5 \leq z \leq 3.9$, and $0.1 \leq k \leq 0.5$.

The lithium precursor may be, for example, lithium tert-butoxide ("LTBO"), lithium dipivaloylmethanate ("Li (DPM)"), lithium acetate, or lithium 2,2,6,6-tetramethyl-3, 5-heptanedionate ("LiTMHD"), or lithium bis-trimethylsilylamide ("LiHMDS"), and the phosphorus precursor may be trimethyl phosphate ("TMPO"), triethylphosphate, or triphenyl phosphite ("TPPi").

Deposition may be performed at different temperatures depending on the type of a lithium precursor and a phosphorus precursor, for example, deposition may be performed at about 305° C. to about 350° C. The thus produced LiPON solid electrolyte may include about 25 mole percent (mol %) to about 40 mol % of lithium (Li), about 10 mol % to about 20 mol % of phosphorus (P), about 40 mol % to about 55 mol % of oxygen (O), and about 2 mol % to about 5 mol % of nitrogen (N), and the ion conductivity thereof may be $1 \times 10^{-6}$ S/cm or greater, for example, about $10^{-6}$ S/cm to about $10^{-4}$ S/cm or about $10^{-6}$ S/cm to about $10^{-5}$ S/cm, and the LiPON solid electrolyte may be amorphous.

Preparation of all-Solid Secondary Battery

The positive electrode 10, the negative electrode 20, and the composite solid electrolyte 32 may be prepared as described above. The composite solid electrolyte 32 may be stacked between the positive electrode 10 and the negative electrode 20, followed by pressurization, to thereby manufacture the all-solid secondary battery 1.

The pressurizing may be omitted.

For example, the composite solid electrolyte 32 may be disposed on the positive electrode 10 to prepare a laminate. Subsequently, the negative electrode 20 may be disposed on a laminate such that the composite solid electrolyte 32 may be adjacent to, e.g., directly on, a negative active material layer 22 to prepare the laminate, and the laminate was pressurized to manufacture the all-solid secondary battery 1. The pressurizing may be performed by, for example, roll pressing, flat pressing, pressing using hydrostatic pressure, or the like. Any suitable pressurizing available in the art may be used. The pressurizing may be performed at, for example, room temperature to a temperature lower than 90° C. or at about 20° C. to about 90° C. In an embodiment, the pressurizing may be performed at a temperature of 100° C. or higher for example, at a temperature of about 100° C. to about 200° C. By such pressurizing, for example, the solid electrolyte powder may be sintered to form one solid electrolyte.

The configuration and method of manufacturing the all-solid secondary battery 1 described above are an embodiment, and the elements and the manufacturing procedure may be appropriately changed.

Hereinafter, a method of manufacturing a positive electrode according to an embodiment will be described in more detail.

According to an embodiment, a positive electrode may be prepared by mixing a composite positive active material, a conductive agent, and a binder in a solid state.

The binder may be any suitable binder available in all-solid lithium battery. The binder may include a thermoplastic resin or a thermosetting resin. Non-limiting examples of the binder include polyethylene, polypropylene, polytetrafluoro ethylene ("PTFE"), polyvinylidene fluoride ("PVdF"), styrene-butadiene rubber, a tetrafluoroethylene-perfluoro alkyl vinyl ether copolymer, a fluorovinylidene-hexafluoropropylene copolymer, a fluorovinylidene-chloro-trifluoroethylene copolymer, an ethylene-tetrafluoroethylene copolymer, a polychlorotrifluoroethylene copolymer, a fluorovinylidene-pentafluoro propylene copolymer, a propylene-tetrafluoroethylene copolymer, an ethylene-chlorotrifluoroethylene copolymer, a fluorovinylidene-hexafluoropropylene-tetrafluoroethylene copolymer, a fluorovinylidene-perfluoromethyl vinyl ether-tetrafluoro ethylene copolymer, an ethylene-acrylic acid copolymer, or a combination thereof.

In an embodiment, upon manufacture of a positive electrode, a composite positive active material, a conductive agent, and a binder may be added to a solvent to prepare a positive active material composition, and the positive active material composition may be coated on a positive electrode current collector and dried to manufacture a positive electrode. In an embodiment, the positive active material composition may be cast on a separate support to form a positive active material film, which may then be separated from the support and laminated on a metallic current collector to prepare a positive electrode plate.

A non-limiting example of the coating method may be a solvent casting method.

Referring to FIG. 1, a structure of an all-solid secondary battery according to an embodiment will be described.

In the all-solid secondary battery 1, the positive electrode 10, the negative electrode 20, and the composite solid electrolyte 32 between the positive electrode 10 and negative electrode 20 may be disposed.

The composite solid electrolyte 32 may be disposed between the positive electrode 10 and the negative electrode 20 and pressurized to manufacture the all-solid secondary battery 1.

The configuration and method of manufacturing the all-solid secondary battery 1 described above are an embodiment, and the elements and the manufacturing procedure may be appropriately changed.

Hereinafter embodiments will be described in detail with reference to Examples and Comparative Examples. These examples are for illustrative purposes only and are not intended to limit the scope of the inventive concept.

EXAMPLES

Preparation of Composite Solid Electrolyte

Examples 1 to 6 and 6A

A lithium phosphorus oxynitride ("LiPON") solid electrolyte was vapor deposited on an anodic aluminum oxide ("AAO") template having an average diameter of pores shown in Table 1 (thickness of 50 micrometers (μm) and porosity of about 13%, available from SPI Supplies) by a plasma-enhanced chemical vapor deposition ("PECVD") method. Lithium tert-butoxide ("LTBO") and trimethyl phosphate ("TMPO") were respectively used as a lithium precursor and a phosphorus precursor. Vapor deposition was performed using the lithium precursor, phosphorus precursor, and N$_2$ plasma according to the deposition condition of Table 1 to form a LiPON electrolyte thin film, thereby forming a composite solid electrolyte. For LTBO, i.e., a subliminal powder precursor, a self-designed canister was used, and the liquid phosphorus precursor was supplied thereto at room temperature (25° C.). Vapor deposition was carried out at 325° C., and 75 watts (W) of radio frequency (RF) plasma was used. The thus produced LiPON solid electrolyte was formed of Li$_x$P$_y$O$_z$N$_K$ (x=3.0, y=1.0, z=3.7, and k=0.3) having an amorphous structure, and an ion conductivity of the LiPON solid electrolyte was about $10^{-6}$ siemens per centimeter (S/cm).

Example 6B

A composite solid electrolyte was manufactured in the same manner as in Example 1, except that the thickness of the AAO template was 75 μm.

Example 6C

A composite solid electrolyte was manufactured in the same manner as in Example 1, except that the thickness of the AAO template was 50 μm.

Example 6B

A composite solid electrolyte was manufactured in the same manner as in Example 1, except that the thickness of the AAO template was 100 μm.

Comparative Examples 1 to 5

Composite solid electrolytes were manufactured in the same manner as in Example 1, except that the conditions were as shown in Table 1.

TABLE 1

| Classification | Average diameter D (nm) of pores of AAO | Deposition time (minutes) | Thickness T$_{SE}$ (nm) of LIPON solid electrolyte film (nm) | T$_{SE}$/D |
| --- | --- | --- | --- | --- |
| Example 1 | 40 | 10 | 40 | 1 |
| Example 2 | 40 | 20 | 80 | 2 |
| Example 3 | 40 | 30 | 120 | 3 |
| Example 4 | 100 | 20 | 80 | 0.8 |
| Example 5 | 100 | 30 | 120 | 1.2 |
| Example 6 | 100 | 60 | 240 | 2.4 |
| Example 6A | 10 | 8 | 30 | 3 |
| Comparative Example 1 | 10 | 10 | 40 | 4 |
| Comparative Example 2 | 10 | 20 | 80 | 8 |
| Comparative Example 3 | 10 | 30 | 120 | 12 |
| Comparative Example 4 | 10 | 60 | 240 | 24 |
| Comparative Example 5 | 40 | 60 | 240 | 6 |

Average diameters of pores of the porous nanostructures in Table 1 were analyzed using scanning electron microscopy (SEM) images by using a field emission scanning electron microscope (FE-SEM, S-4800, Hitachi, Japan).

Preparation of all-Solid Secondary Battery

Example 7

A lithium metal negative electrode (having a thickness of about 20 μm) was disposed on a current collector (a copper foil), and the composite solid electrolyte manufactured in Example 1 was disposed on the negative electrode, followed by pressurization at room temperature and at 2,500 bar for 3 minutes. The solid electrolyte of the composite solid electrolyte was disposed adjacent to the negative electrode.

A positive electrode was disposed on another surface (AAO as a porous nanostructure) of the composite solid electrolyte, and the resultant was subject to vacuum sealing at a temperature of about 25° C., thereby completing the manufacture of an all-solid secondary battery.

The positive electrode was impregnated in a liquid electrolyte. The liquid electrolyte was obtained by mixing an ionic liquid, i.e., N-methyl-N-propylpyrrolidinium bis(trifluoromethanesulfonyl) imide ("PYR13TFSI") and a lithium salt, i.e., lithium bis(trifluoromethylsulfonyl)imide ("LiTFSI"), followed by stirring at room temperature (25° C.). A mixing weight ratio of the ionic liquid to the lithium salt was 10:100.

The positive electrode before being impregnated in, e.g., with, the liquid electrolyte, i.e., $LiNi_{0.8}Co_{0.15}Mn_{0.05}O_2$ ("NCM"), a conductive agent (Super-P, Timcal Ltd.), a polyvinylidene fluoride ("PVdF"), and N-methyl pyrrolidone were mixed to obtain a composition for forming a positive active material layer. In the composition for forming a positive active material layer, the mixing weight ratio of LCO to conductive agent to PVdF was about 97:1.5:1.5, and the amount of N-methyl pyrrolidone was about 137 grams (g) with respect to 97 g of LCO.

The composition for forming a positive active material layer was coated on an aluminum foil (having a thickness of about 15 μm) and then dried at 25° C., followed by drying the result at about 110° C. under vacuum to thereby prepare a positive electrode.

Examples 8 to 12

All-solid secondary batteries were manufactured in the same manner as in Example 7, except that the composite solid electrolytes of Examples 2 to 6 were each used instead of the composite solid electrolyte of Example 1.

Examples 13 and 14

All-solid secondary batteries were manufactured in the same manner as in Example 7, except that the composite solid electrolytes of Examples 6A and 6B were each used instead of the composite solid electrolyte of Example 1.

Comparative Examples 6 to 10

All-solid secondary batteries were manufactured in the same manner as in Example 7, except that the composite solid electrolytes of Comparative Examples 1 to 5 were each used instead of the composite solid electrolyte of Example 1.

Comparative Example 11

A lithium-ion battery was manufactured in the same manner as in Example 7, except that N-methyl-N-propyl pyrrolidium bis(trifluoromethane sulfonyl)imide as an ionic liquid and a polypropylene/polyethylene/polypropylene ("PP/PE/PP") laminated membrane as a polymer separator were used instead of the composite sold electrolyte of Example 1.

Evaluation Example 1: Impedance

The resistance of each of the all-solid secondary batteries of Examples 8 and 10 and Comparative Example 7 was measured by using an impedance analyzer (Solartron 1260A Impedance/Gain-Phase Analyzer) at a temperature of about 60° C., according to the 2-probe method. Here, the amplitude was 10 millivolts (mV), and the frequency was in a range of $10^6$ hertz (Hz) to $10^{-1}$ Hz.

Figure 3A:
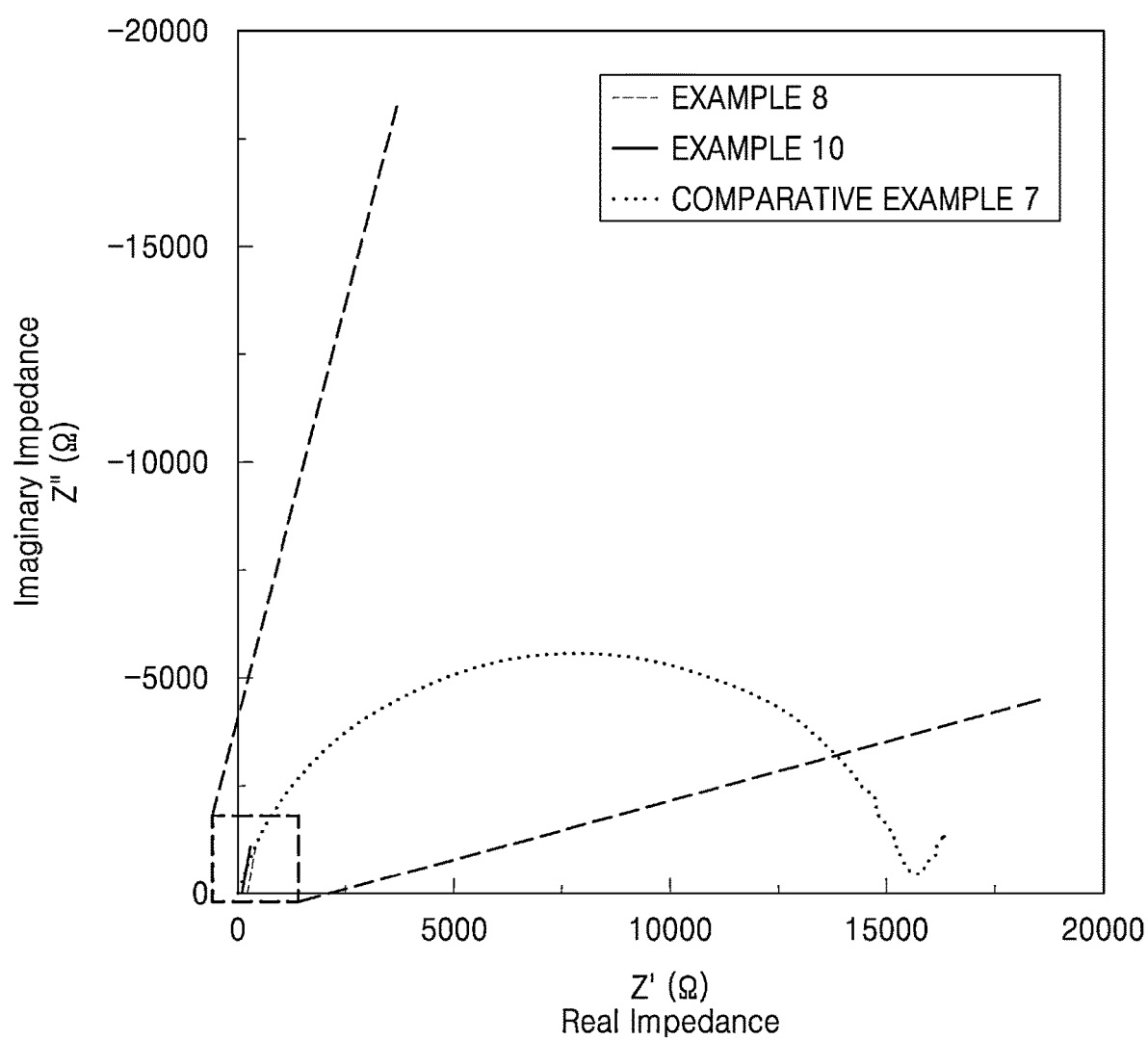
FIG. 3A is a graph of imaginary impedance Z" (ohms (Ω)) versus real impedance Z' (Ω) of the all-solid secondary batteries of Examples 8 and 10 and Comparative Example 7, showing analysis results of impedance properties thereof.
Figure 3B:
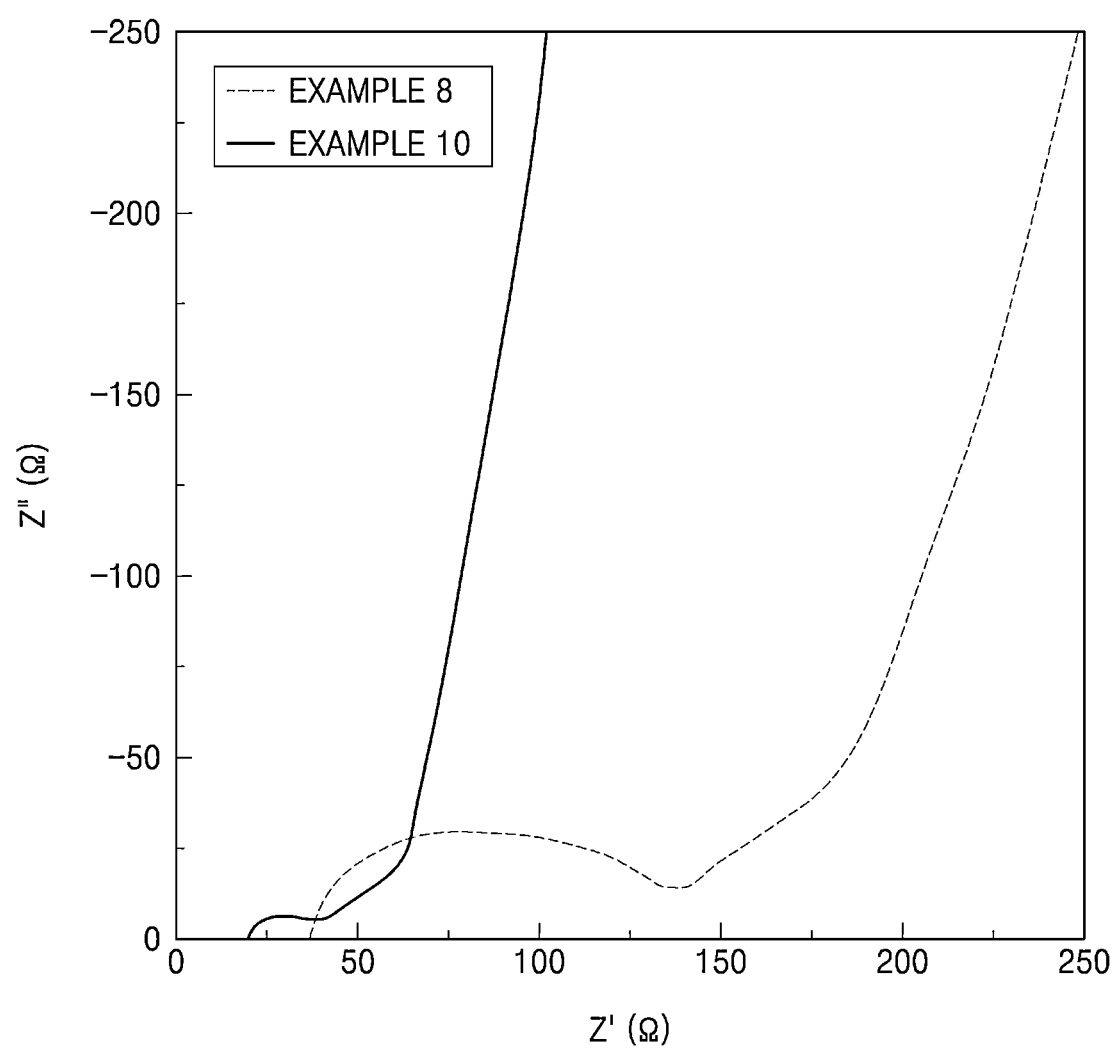
FIG. 3B is an enlarged view of a portion of FIG. 3A, showing analysis results of impedance properties of the all-solid secondary batteries of Examples 8 and 10.

The results of impedance measurement are shown in FIGS. 3A and 3B.

The all-solid secondary battery of Example 8 and the all-solid secondary battery of Example 10 were found to have a reduced interfacial resistance, as compared with the all-solid secondary battery of Comparative Example 7. The all-solid secondary battery of Comparative Example 7 was found to have a great interfacial resistance as shown in FIG. 3A.

Evaluation Example 2: Charge/Discharge Cycle Characteristics

Charge/discharge characteristics of the all-solid secondary batteries of Examples 8 and 10 and Comparative Example 7 were evaluated by the following charge/discharge test.

The charge/discharge evaluation of the all-solid secondary batteries was performed in a thermostatic bath at a temperature of 60° C.

In the first cycle, the battery was charged with a constant current of 0.3 milliamperes per square meter ($mA/cm^2$) for 12.5 hours until the battery voltage reached 4.25 volts (V). Subsequently, the battery was discharged with a constant current of 3.2 $mA/cm^2$ for 12.5 hours until the battery voltage reached 2.85 V.

In the second cycle, the charging and discharging were performed under the same condition as the first cycle. This cycle was repeated to the 50th cycle under the same condition as the first cycle.

Figure 2:
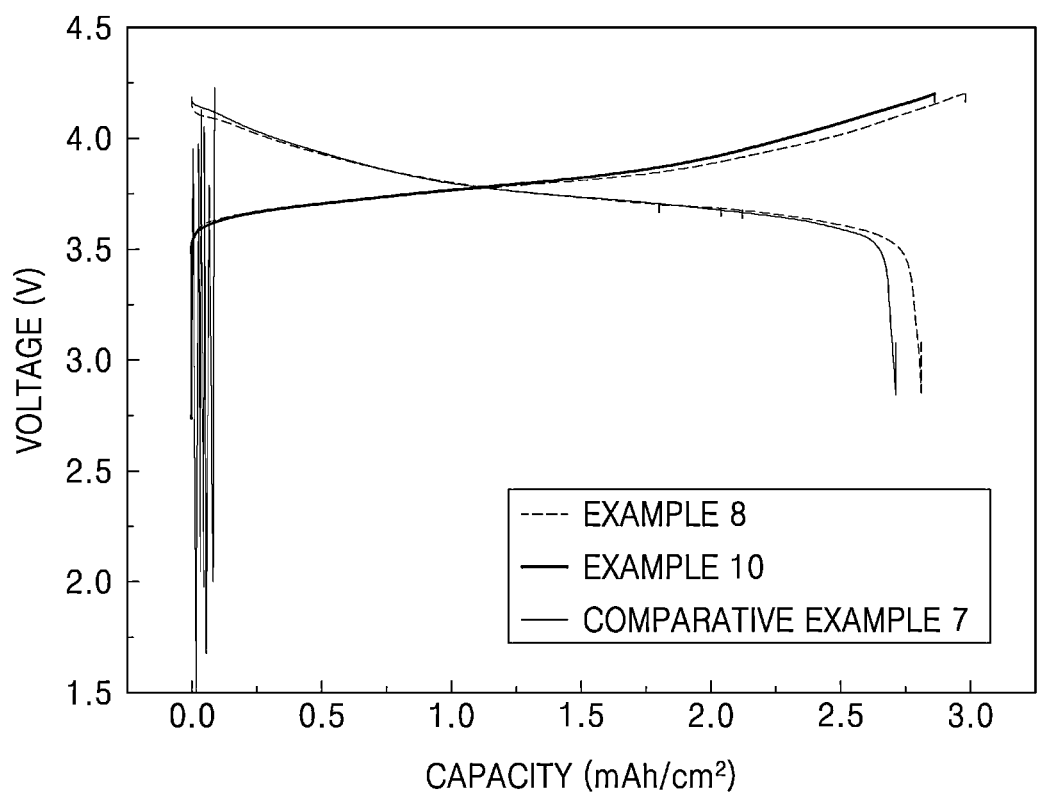
FIG. 2 is a graph of voltage (volts (V)) versus capacity (milliampere-hours per square centimeter ($mAh/cm^2$)) of all-solid secondary batteries of Examples 8 and 10 and Comparative Example 7, showing voltage changes according to capacity per unit area.

The discharge capacity per unit area of the all-solid secondary battery was measured and shown in FIG. 2.

As shown in FIG. 2, the all-solid secondary batteries of Examples 8 and 10 respectively employing the composite solid electrolytes of Examples 2 and 4 were found to have improved cycle characteristics while working normally, as compared with the all-solid secondary battery of Comparative Example 7 employing the solid electrolyte of Comparative Example 2.

Evaluation Example 3: SEM and Energy Dispersive Spectroscopy (EDS) Analysis

Figure 5A:
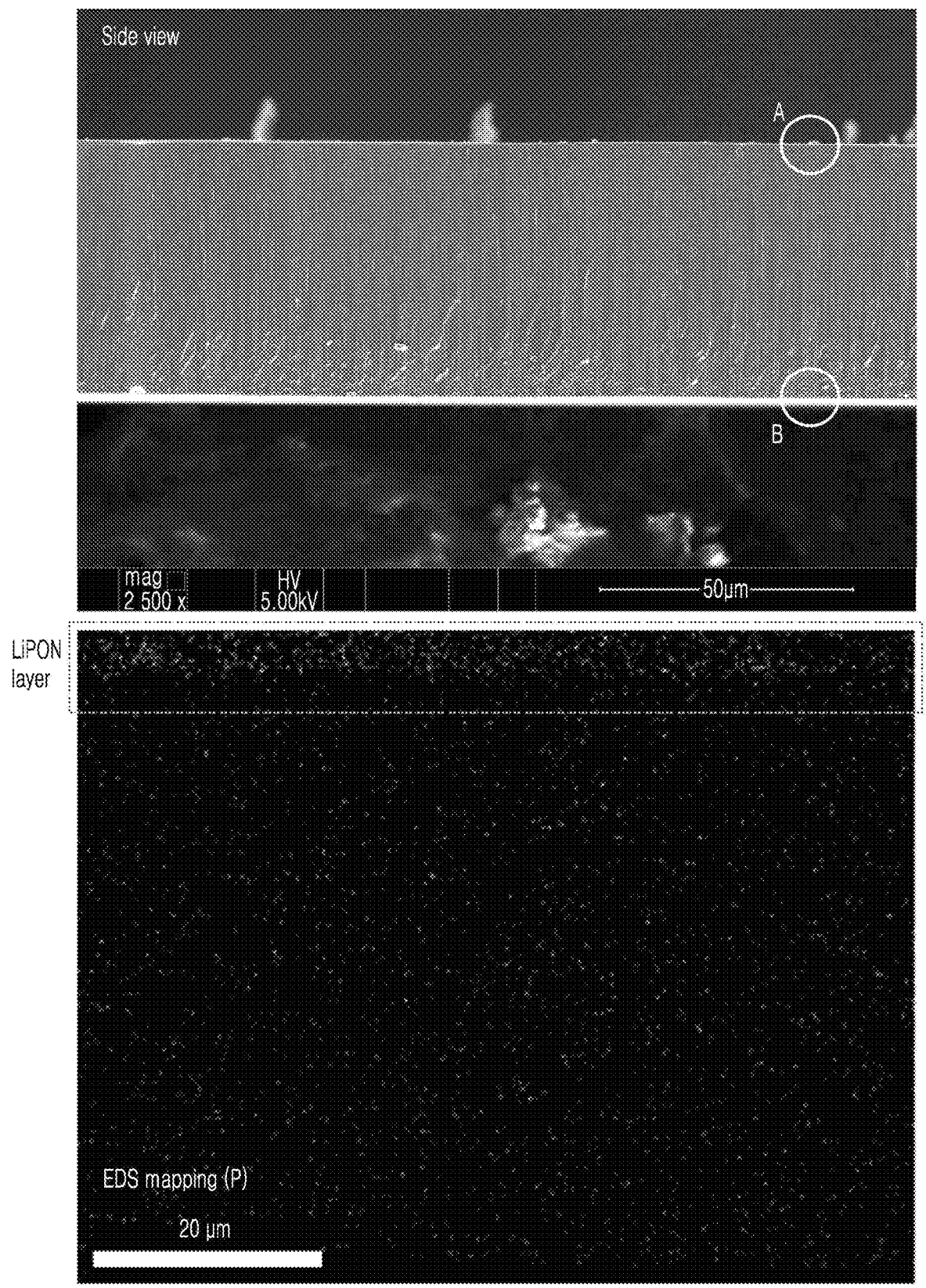
FIG. 5A shows results of scanning electron microscopy ("SEM") analysis of a composite solid electrolyte of Example 1.
Figure 5B:
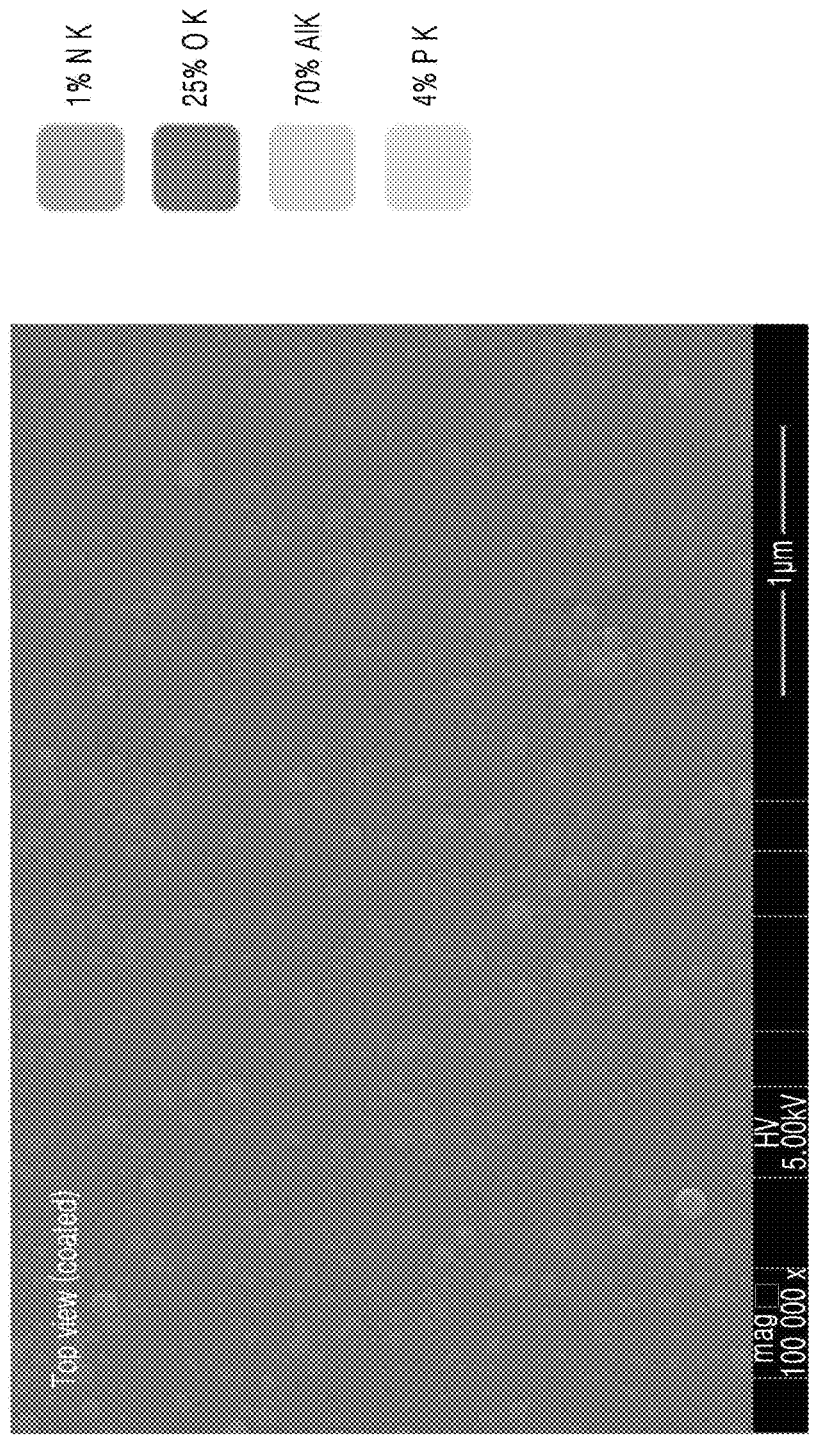
FIG. 5B shows results of energy dispersive spectroscopy (EDS) analysis of region A in FIG. 5A.
Figure 5C:
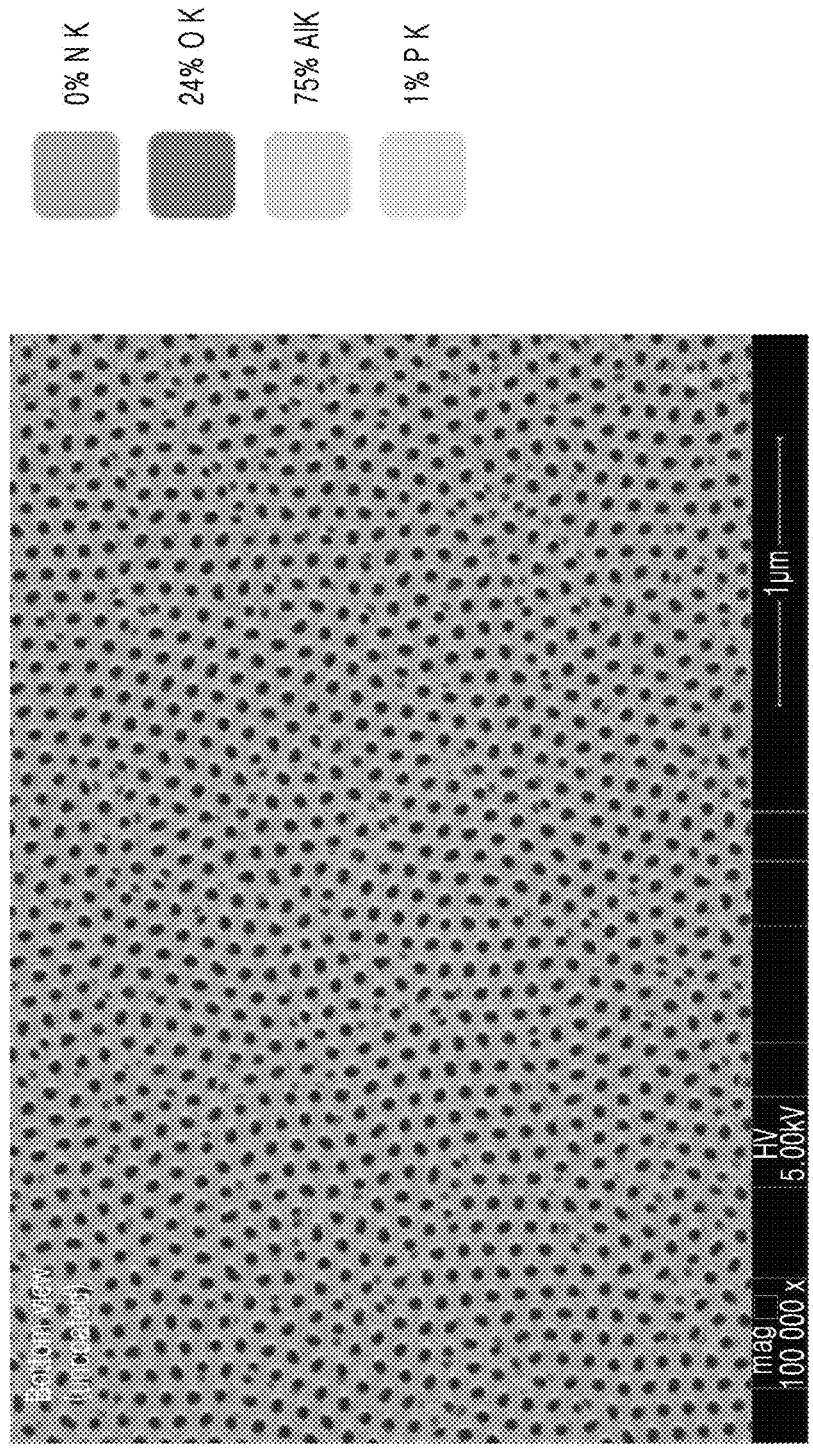
FIG. 5C shows results of EDS analysis of region B in FIG. 5A.

The SEM and EDS analyses were performed on the solid electrolyte in the composite solid electrolyte of the all-solid battery of Example 1. In the SEM and EDS analyses, a FE-SEM (SU-9000 available from Hitachi) was used. The results of analyses are shown in FIGS. 5A to 5C. FIG. 5A shows the SEM analysis result of the composite solid electrolyte of Example 1, FIG. 5B shows the EDS analysis result of region A in FIG. 5A, and FIG. 5C shows the EDS analysis result of region B in FIG. 5A.

Referring to the results of the analyses, according to the top view, the composite electrolyte of Example 1 was found to have a LIPON coating film. In addition, through SEM and EDMS analysis, a uniform coating layer was found to be formed.

Evaluation Example 4: Battery Operation Evaluation

The operation of the all-solid secondary batteries of Examples 7 to 14 and Comparative Examples 6 to 10 were evaluated.

The operation evaluation was performed by measuring the discharge capacity with respect to the positive electrode through the following constant current charging and discharging method.

Charge/discharge characteristics of each of the all-solid secondary batteries were evaluated by the following charge/discharge test. The charge/discharge test of the all-solid secondary batteries was performed in a thermostatic bath at a temperature of 25° C.

Then, the battery was discharged with a constant current of 0.7 mA/cm² until the voltage reached 4.2 V. Subsequently, the battery was discharged with a constant current of 0.35 mA/cm² until the battery voltage reached 2.85 V.

The results of evaluation are shown in Table 2.

TABLE 2

| Classification | Composite solid electrolyte | $T_{SE}/D$ | Battery Operation test |
|---|---|---|---|
| Example 7 | Example 1 | 1 | Operated |
| Example 8 | Example 2 | 2 | Operated |
| Example 9 | Example 3 | 3 | Operated |
| Example 10 | Example 4 | 0.8 | Operated |
| Example 11 | Example 5 | 1.2 | Operated |
| Example 12 | Example 6 | 2.4 | Operated |
| Example 13 | Example 6A | 3 | Operated |
| Example 14 | Example 6B | 1 | Operated |
| Comparative Example 6 | Comparative Example 1 | 4 | Did not operate |
| Comparative Example 7 | Comparative Example 2 | 8 | Did not operate |
| Comparative Example 8 | Comparative Example 3 | 12 | Did not operate |
| Comparative Example 9 | Comparative Example 4 | 24 | Did not operate |
| Comparative Example 10 | Comparative Example 5 | 6 | Did not operate |

As shown in Table 2, the operation of all-solid secondary batteries of Examples 7 to 12 worked well unlike the all-solid secondary batteries of Comparative Examples 6 to 10.

On the other hand, the operation of the all-solid secondary batteries of Comparative Examples 6 to 10 did not proceed. In the composite solid electrolytes of Examples 1 to 6, 6A, and 6B, in which the given range of the thickness ($T_{SE}$) of the solid electrolyte to the average diameter of pores of the porous nanostructure thickness ($T_{SE}$) of the solid electrolyte is satisfied, it was found that pores of the porous nanostructure were impregnated with the liquid electrolyte such as an ionic liquid and served as a supporter for the solid electrolyte, thereby enabling smooth battery operation.

Evaluation Example 5: Cycle Characteristics

The cycle characteristics of the all-solid secondary battery of Example 7 and the lithium-ion battery of Comparative Example 11 were evaluated.

Charge/discharge characteristics of each of the all-solid secondary battery and lithium-ion battery were evaluated by the following charge/discharge evaluation. The charge/discharge evaluation of each of the all-solid secondary battery and lithium-ion battery was performed in a thermostatic bath at a temperature of 25° C.

Then, the battery was discharged with a constant current of 0.7 mA/cm² until the voltage reached 4.2 V. Subsequently, the battery was discharged with a constant current of 0.35 mA/cm² until the battery voltage reached 2.85 V.

Figure 4:
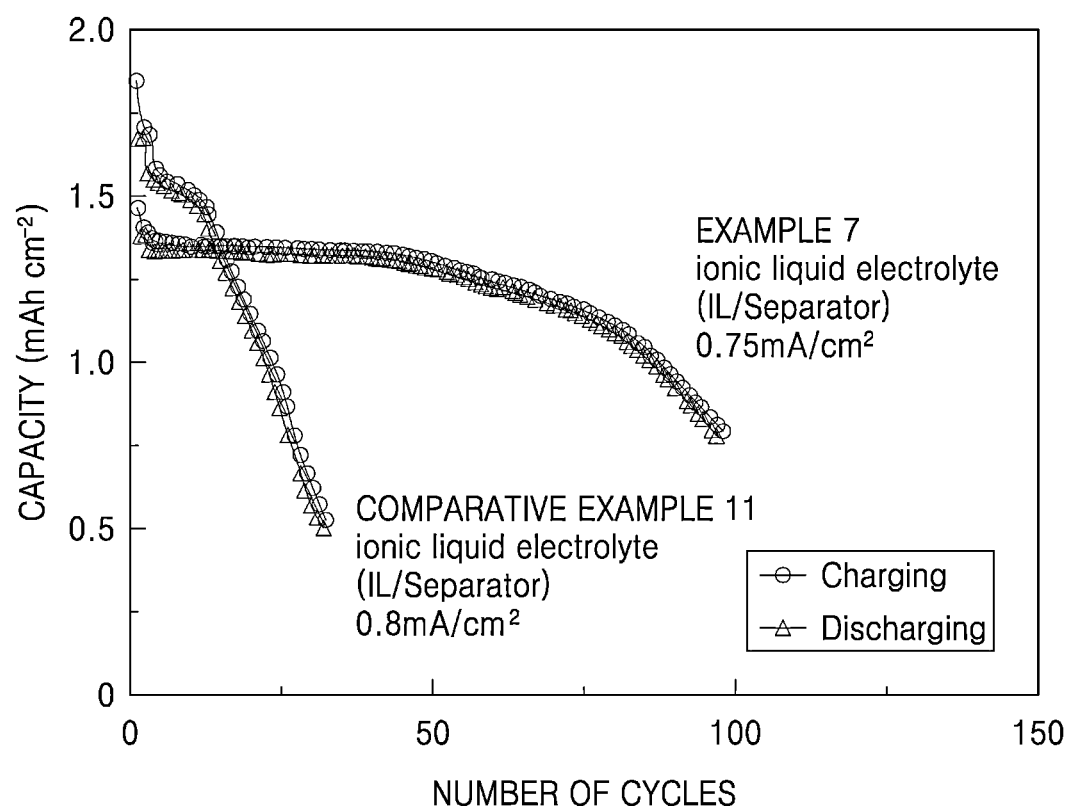
FIG. 4 is a graph of capacity ($mAh\ cm^{-2}$)) versus number of cycles, showing cycle characteristics of the lithium-ion battery of Comparative Example 11.

The charge/discharge process was repeated for 100 times, and the results thereof are shown in FIG. 4.

The evaluation results of the cycle characteristics are shown in FIG. 4.

The lithium-ion battery of Comparative Example 11 was found to have deteriorated cycle characteristics as shown in FIG. 4. Such deterioration of cycle characteristics is due to corrosion of the current collector by an ionic liquid electrolyte or side reactions of lithium metal and the ionic liquid electrolyte.

In contrast, the all-solid secondary battery of Example 7 was found to have an excellent capacity retention rate of 80% or greater even after 100 cycles.

As apparent from the foregoing description, when the composite solid electrolyte according to an aspect is used, leakage of a positive electrode electrolyte outside of the positive electrode may be decreased or prevented, lithium mobility of the positive electrode and the solid electrolyte may be improved, and an interfacial resistance may be reduced. When such a composite solid electrolyte is used, an electrochemical battery having improved cycle characteristics and lifespan characteristics may be manufactured.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A composite solid electrolyte comprising:
a porous nanostructure; and
a solid electrolyte disposed on a surface of the porous nanostructure,
wherein the composite solid electrolyte satisfies Equation 1

$$0.8 \leq T_{SE}/D \leq 3, \qquad \text{Equation 1}$$

wherein
$T_{SE}$ is a thickness of the solid electrolyte, and
D is an average diameter of pores of the porous nanostructure,
wherein the porous nanostructure has a lithium ion conductivity of about $1\times10^{-6}$ siemens per centimeter to about $1\times10^{-3}$ siemens per centimeter, an electrical conductivity of about $1\times10^{-17}$ siemens per centimeter to about $1\times10^{-8}$ siemens per centimeter, or a lithium ion conductivity of about $1\times10^{-6}$ siemens per centimeter to about $1\times10^{-3}$ siemens per centimeter and an electrical conductivity of about $1\times10^{-17}$ siemens per centimeter to about $1\times10^{-8}$ siemens per centimeter,
wherein an average diameter of pores of the porous nanostructure is in a range of about 10 nanometers to about 100 nanometers,
wherein a thickness of the solid electrolyte is in a range of about 30 nanometers to about 240 nanometers,
wherein the porous nanostructure comprises an anodic aluminum oxide,
wherein the solid electrolyte comprises a lithium phosphorus oxynitride,
wherein the composite solid electrolyte further comprises a liquid electrolyte,
wherein the solid electrolyte is located on a surface of the porous nanostructure, and wherein a pore of the porous nanostructure contains the liquid electrolyte.

2. The composite solid electrolyte of claim 1, wherein $T_{SE}/D$ in Equation 1 is in a range of 1.2 to 2.4.

3. The composite solid electrolyte of claim 1, wherein a porosity of the porous nanostructure is in a range of about 12% to about 15%.

4. The composite solid electrolyte of claim 1, wherein a ratio of a thickness of the porous nanostructure to the thickness of the solid electrolyte is in a range of about 10:1 to about 10,000:1.

5. The composite solid electrolyte of claim 1, wherein the liquid electrolyte comprises an ionic liquid, a lithium salt, an organic solvent, or a combination thereof.

6. An electrochemical battery comprising:
a positive electrode layer;
a negative electrode layer; and
a solid electrolyte layer disposed between the positive electrode layer and the negative electrode layer,
wherein the solid electrolyte layer comprises the composite solid electrolyte of claim 1.

7. The electrochemical battery of claim 6, wherein the positive electrode layer further comprises a liquid electrolyte comprising an ionic liquid, a lithium salt, an organic solvent, or a combination thereof.

8. The electrochemical battery of claim 6, wherein
the positive electrode layer comprises a lithium nickel manganese oxide, a lithium cobalt oxide, a lithium nickel cobalt manganese oxide, a lithium nickel cobalt aluminum oxide, a lithium phosphate iron oxide, an overlithiated layered oxide, or a combination thereof, and
the negative electrode layer comprises amorphous carbon, crystalline carbon, metal, a metalloid capable of forming an alloy or a compound with lithium, or a combination thereof.

9. The electrochemical battery of claim 6, wherein the electrochemical battery is an all-solid secondary battery.

10. A method of preparing the composite solid electrolyte of claim 1, the method comprising:
providing the solid electrolyte on the surface of the porous nanostructure.

11. A composite solid electrolyte comprising:
a porous nanostructure; and
a solid electrolyte disposed on a surface of the porous nanostructure,
wherein the composite solid electrolyte satisfies Equation 1

$$1.0 \leq T_{SE}/D \leq 3, \quad \text{Equation 1}$$

wherein
$T_{SE}$ is a thickness of the solid electrolyte, and
D is an average diameter of pores of the porous nanostructure, and
a thickness of the solid electrolyte is in a range of about 30 nanometers to about 240 nanometers, and the thickness of the porous nanostructure is in a range of about 30 micrometers to about 100 micrometers, wherein an average diameter of pores of the porous nanostructure is in a range of about 10 nanometers to about 100 nanometers,
wherein the porous nanostructure comprises an anodic aluminum oxide,
wherein the solid electrolyte comprises a lithium phosphorus oxynitride,
wherein the composite solid electrolyte further comprises a liquid electrolyte,
wherein the solid electrolyte is located on a surface of the porous nanostructure, and
wherein a pore of the porous nanostructure contains the liquid electrolyte.

12. A composite solid electrolyte comprising:
a porous nanostructure;
a solid electrolyte disposed on a surface of the porous nanostructure; and
a liquid electrolyte present in a pore of the porous nanostructure,
wherein the liquid electrolyte comprises an ionic liquid and a lithium salt,
wherein a thickness of the solid electrolyte is in a range of about 30 nanometers to about 240 nanometers,
wherein a thickness of the porous nanostructure is in a range of about 30 micrometers to about 100 micrometers,
wherein an average diameter of pores of the porous nanostructure is in a range of about 10 nanometers to about 100 nanometers, and
wherein a pore density of the porous nanostructure is in a range of about $5 \times 10^8$ reciprocal square centimeters to about $1.6 \times 10^{11}$ reciprocal square centimeters, and
wherein the composite solid electrolyte satisfies Equation 1

$$0.8 \leq T_{SE}/D \leq 3, \quad \text{Equation 1}$$

wherein
$T_{SE}$ is the thickness of the solid electrolyte,
D is the average diameter of pores of the porous nanostructure,
wherein the porous nanostructure comprises an anodic aluminum oxide,
wherein the solid electrolyte comprises a lithium phosphorus oxynitride,
wherein the composite solid electrolyte further comprises a liquid electrolyte.

13. The composite solid electrolyte of claim 12, wherein the porous nanostructure has a lithium ion conductivity of about $1 \times 10^{-6}$ siemens per centimeter to about $1 \times 10^{-3}$ siemens per centimeter, an electrical conductivity of about $1 \times 10^{-17}$ siemens per centimeter to about $1 \times 10^{-8}$ siemens per centimeter, or a lithium ion conductivity of about $1 \times 10^{-6}$ siemens per centimeter to about $1 \times 10^{-3}$ siemens per centimeter and an electrical conductivity of about $1 \times 10^{-17}$ siemens per centimeter to about $1 \times 10^{-8}$ siemens per centimeter.

* * * * *